(12) United States Patent
Fujiwara et al.

(10) Patent No.: US 11,139,973 B2
(45) Date of Patent: *Oct. 5, 2021

(54) LOCKING AND UNLOCKING SYSTEM AND KEY UNIT

(71) Applicant: TOYOTA JIDOSHA KABUSHIKI KAISHA, Toyota (JP)

(72) Inventors: Yasuhisa Fujiwara, Miyoshi (JP); Hiroko Tsujimura, Gifu (JP); Yuichiro Haruna, Oyama (JP); Satoru Maegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

This patent is subject to a terminal disclaimer.

(21) Appl. No.: 15/914,174

(22) Filed: Mar. 7, 2018

(65) Prior Publication Data
US 2018/0262336 A1  Sep. 13, 2018

(30) Foreign Application Priority Data

Mar. 9, 2017  (JP) .............................. JP2017-045101

(51) Int. Cl.
*H04L 9/32* (2006.01)
*G07C 9/00* (2020.01)
*H04L 9/08* (2006.01)

(52) U.S. Cl.
CPC .......... *H04L 9/321* (2013.01); *G07C 9/00309* (2013.01); *G07C 9/00571* (2013.01);
(Continued)

(58) Field of Classification Search
CPC ....... H04L 9/321; H04L 9/083; H04L 9/0894; H04L 9/3226; H04L 2209/84;
(Continued)

(56) References Cited

U.S. PATENT DOCUMENTS 8,577,293 B2 * 11/2013 Takayama ............. H04L 9/0825
 455/41.2
9,853,812 B2 * 12/2017 Mehta .................. H04L 63/0442
(Continued)

FOREIGN PATENT DOCUMENTS

CN 103617450 A 3/2014
CN 104732408 A 6/2015
(Continued)

OTHER PUBLICATIONS

Notice of Allowance dated May 30, 2019 in U.S. Appl. No. 15/629,782 (now U.S. Pat. 10,382,412 B2), 9 pages.
(Continued)

*Primary Examiner* — Eleni A Shiferaw
*Assistant Examiner* — Stephanie S Ham
(74) *Attorney, Agent, or Firm* — Oblon, McClelland, Maier & Neustadt, L.L.P.

(57) ABSTRACT

A locking and unlocking system includes: a mobile terminal; and a key unit, wherein the mobile terminal includes a terminal transmission unit configured to transmit first authentication information and a first request signal to the key unit, the key unit includes: a key unit reception unit configured to receive the first authentication information and the first request signal from the mobile terminal; a first authentication unit configured to perform authentication; and a locking and unlocking processing unit configured to perform a process of unlocking or locking the door, and the first authentication unit is configured to prohibit the authentication of the mobile terminal in a case where the first authentication unit has once performed the authentication.

4 Claims, 10 Drawing Sheets

(52) U.S. Cl.
CPC ..... *G07C 9/00714* (2013.01); *G07C 9/00857* (2013.01); *H04L 9/083* (2013.01); *H04L 9/0894* (2013.01); *H04L 9/3226* (2013.01); *G07C 2009/00865* (2013.01); *G07C 2209/08* (2013.01); *H04L 2209/84* (2013.01)

(58) Field of Classification Search
CPC .............. G07C 9/0039; G07C 9/00714; G07C 9/00857; G07C 9/00309; G07C 9/00571; G07C 2009/00865; G07C 2209/08; H07C 9/00571
See application file for complete search history.

(56) References Cited

U.S. PATENT DOCUMENTS

| | | | |
|---|---|---|---|
| 10,382,412 B2 | 8/2019 | Fujiwara et al. | |
| 2006/0255910 A1 | 11/2006 | Fukushima et al. | |
| 2008/0104401 A1* | 5/2008 | Miyamoto | H04L 9/3268 713/175 |
| 2008/0168544 A1* | 7/2008 | von Krogh | G06F 21/445 726/6 |
| 2011/0087370 A1* | 4/2011 | Denison | G07F 7/1008 700/236 |
| 2011/0196731 A1* | 8/2011 | Christie | H04L 9/3263 705/14.26 |
| 2015/0061828 A1 | 3/2015 | Fischer et al. | |
| 2015/0089222 A1* | 3/2015 | White | H04L 9/3249 713/168 |
| 2015/0137943 A1 | 5/2015 | Nagel et al. | |
| 2016/0080149 A1 | 3/2016 | Mehta et al. | |
| 2016/0098870 A1 | 4/2016 | Bergerhoff et al. | |
| 2017/0053470 A1 | 2/2017 | Bergerhoff et al. | |
| 2017/0054694 A1* | 2/2017 | Fujikami | H04W 12/04033 |
| 2017/0263062 A1* | 9/2017 | Bergerhoff | G07C 9/00571 |
| 2017/0374047 A1 | 12/2017 | Fujiwara et al. | |
| 2018/0047232 A1* | 2/2018 | Sakumoto | G07C 9/00309 |
| 2018/0076958 A1* | 3/2018 | Narimoto | H04L 9/0877 |

FOREIGN PATENT DOCUMENTS

| | | |
|---|---|---|
| CN | 105050081 A | 11/2015 |
| CN | 104018716 B | 12/2015 |
| CN | 105516163 A | 4/2016 |
| CN | 105539365 A | 5/2016 |
| CN | 105894628 A | 8/2016 |
| DE | 10 2012 012 389 A1 | 1/2013 |
| DE | 10 2014 219 502 A1 | 3/2016 |
| JP | 2006-118122 | 5/2006 |
| JP | 2010-213185 A | 9/2010 |
| JP | 2012-028854 A | 2/2012 |
| JP | 2013-124486 A | 6/2013 |
| JP | 2013-204254 | 10/2013 |
| JP | 2013-234519 A | 11/2013 |
| JP | 2015-055107 A | 3/2015 |
| JP | 2015-169008 A | 9/2015 |
| JP | 2016-016835 A | 2/2016 |
| JP | 2016-223212 A | 12/2016 |
| WO | 2005/070733 A1 | 8/2005 |
| WO | WO 2016/194303 A1 | 12/2016 |

OTHER PUBLICATIONS

Notice of Allowance dated Mar. 13, 2019 in U.S. Appl. No. 15/629,782 (now U.S. Pat. 10,382,412 B2), 13 pages.
Combined Chinese Office Action and Search Report dated Nov. 4, 2020 in Patent Application No. 201810187799.8 (submitting English translation only), 14 pages.

* cited by examiner

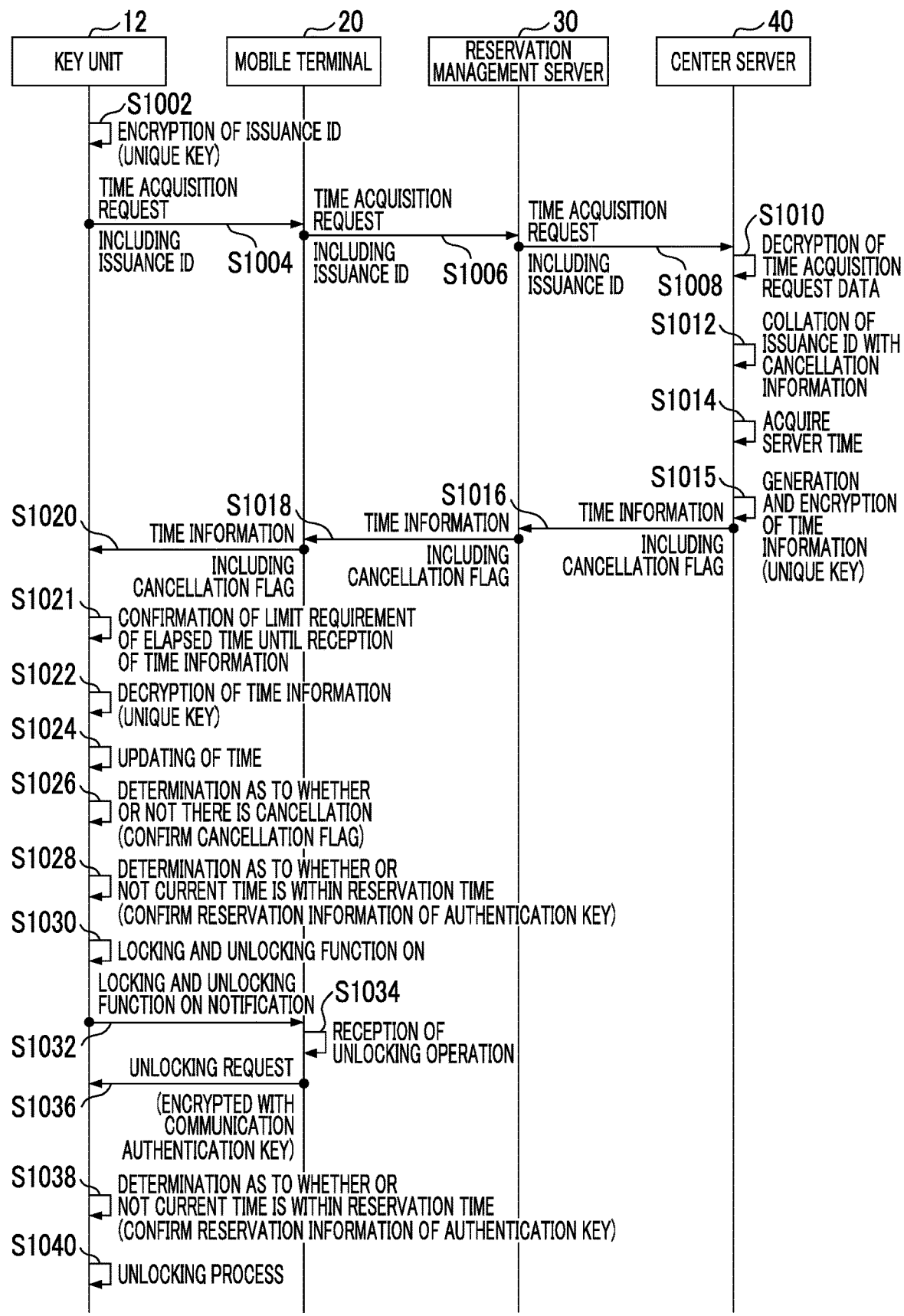

LOCKING AND UNLOCKING SYSTEM AND KEY UNIT

INCORPORATION BY REFERENCE

The disclosure of Japanese Patent Application No. 2017-045101 filed on Mar. 9, 2017 including the specification, drawings and abstract is incorporated herein by reference in its entirety.

BACKGROUND

1. Technical Field

The present disclosure relates to a locking and unlocking system and a key unit.

2. Description of Related Art

A key management system in which a mobile terminal receives key information for unlocking a vehicle, that is, authentication information for determining whether or not unlocking is permitted on the vehicle side from a server over a network, and the mobile terminal can be used as an electronic key is disclosed (see, for example, Japanese Unexamined Patent Application Publication No. 2006-118122 (JP 2006-118122 A)).

By using the above-described configuration, in a case where a plurality of users uses a specific vehicle in split time slots, as in a rental car, a share car, a company car, and the like, time and effort such as delivery of an electronic key can be reduced and convenience of the user is improved.

The same technology can be used for locking and unlocking of the same facility (for example, a facility such as a conference room, a health center, or a gymnasium) that a plurality of users uses in different time slots, and convenience of the user is improved by using a mobile terminal as an electronic key with respect to a locking and unlocking device installed in the facility.

SUMMARY

However, for example, in a case where authentication information that is transmitted from the mobile terminal to the vehicle or the facility is intercepted by a malicious third party, the malicious third party is likely to make unauthorized use of a vehicle or a facility that is the target using the intercepted authentication information.

The present disclosure provides a locking and unlocking system and a key unit capable of suppressing unauthorized use of a vehicle or a facility based on intercepted authentication information even in a case where authentication information that is transmitted from a mobile terminal to the vehicle or the facility is intercepted.

A first aspect of the present disclosure relates to a locking and unlocking system including: a mobile terminal; and a key unit provided in a vehicle or a facility and configured to lock and unlock a door of the vehicle or the facility. The mobile terminal includes a terminal transmission unit configured to transmit predetermined first authentication information and a first request signal for requesting unlocking or locking of the door of the vehicle or the facility to the key unit. The key unit includes a key unit reception unit configured to receive the first authentication information and the first request signal from the mobile terminal; a first authentication unit configured to perform authentication of the mobile terminal based on the first authentication information in a case where the key unit reception unit receives the first authentication information; and a locking and unlocking processing unit configured to perform a process of unlocking or locking the door of the vehicle or the facility in a case where the first authentication unit has succeeded in the authentication of the mobile terminal and the key unit reception unit has received the first request signal. The first authentication unit is configured to prohibit the authentication of the mobile terminal in a case where the first authentication unit has once performed the authentication of the mobile terminal based on the first authentication information, and then, even in a case where the key unit reception unit has received the first authentication information.

According to the first aspect of the present disclosure, the first authentication unit prohibits the authentication of another mobile terminal in a case where the key unit (the first authentication unit) has once performed the authentication of the mobile terminal based on the first authentication information, and then, even in a case where the same first authentication information is received from the other mobile terminal. Therefore, even in a case where a malicious third party can intercept the first authentication information when the first authentication information is transmitted from the mobile terminal to the key unit, the other mobile terminal cannot be authenticated using the first authentication information. Therefore, even in a case where the first authentication information transmitted from the mobile terminal to the key unit disposed inside the vehicle or the facility is intercepted, it is possible to suppress unauthorized use of the vehicle or the facility based on the intercepted first authentication information.

In the locking and unlocking system according to the first aspect of the present disclosure, the mobile terminal may include a first storage unit configured to store a predetermined first encryption key for encrypting data, the key unit may include a second storage unit configured to store a first decryption key for decrypting data encrypted with the first encryption key, the terminal transmission unit may be configured to transmit the first request signal encrypted with the first encryption key to the key unit, and the locking and unlocking processing unit may be configured to unlock or lock the door of the vehicle or the facility in a case where the first authentication unit has succeeded in the authentication of the mobile terminal and the key unit reception unit has received the first request signal that is to be decrypted with the first decryption key.

According to the first aspect of the present disclosure, the mobile terminal (the terminal transmission unit) transmits the first request signal encrypted with the first encryption key to the key unit, and the key unit (the locking and unlocking processing unit) performs the process of locking or unlocking the vehicle or the facility in a case where the authentication of the mobile terminal has been successful and the first request signal that can be decrypted with the first decryption key corresponding to the first encryption key has been received. Therefore, the key unit can determine that the request is a request from the authenticated mobile terminal by receiving the first request signal that can be decrypted with the first decryption key. Therefore, when the authentication of the mobile terminal based on the first authentication information is completed once, the user of the mobile terminal can unlock or lock the door of the vehicle or the facility without using the first authentication information even in a situation in which the authentication of the mobile terminal using the first authentication information can be performed merely once, and it is possible to maintain the convenience of the user while suppressing unauthorized use of the vehicle or the facility by a malicious third party.

In the locking and unlocking system according to the first aspect of the present disclosure, the key unit may include a third storage unit configured to store a predetermined second encryption key for encrypting data; and a key unit transmission unit configured to transmit the first encryption key encrypted with the second encryption key to the mobile terminal in a case where the first authentication unit has succeeded in the authentication of the mobile terminal, and then, transmit the first encryption key updated and encrypted with the second encryption key to the mobile terminal each time a transition from a communication disabled state to a communication enabled state occurs between the key unit and the mobile terminal. The mobile terminal may include a first terminal reception unit configured to receive the first encryption key encrypted with the second encryption key, which is transmitted by the key unit; and a fourth storage unit configured to store a second decryption key for decrypting data encrypted with the second encryption key.

According to the first aspect of the present disclosure, the key unit can transmit the first encryption key encrypted with the second encryption key to the mobile terminal, and the mobile terminal can receive the encrypted first encryption key from the key unit and decrypt the encrypted first encryption key with the second decryption key held by the mobile terminal. Therefore, it is possible to cause the mobile terminal to acquire the decrypted first encryption key while suppressing the leakage of the first encryption key when the first encryption key is transmitted from the key unit to the mobile terminal. The first encryption key is transmitted from the key unit to the mobile terminal in a case where the authentication of the mobile terminal is completed. Each time a transition from the communication disabled state to the communication enabled state occurs between the mobile terminal and the key unit, that is, each time the user holding the mobile terminal locks the door, and temporarily departs from the vehicle or the facility, and then, approaches the vehicle or the facility again, the first encryption key different from the previous encryption key is transmitted from the key unit to the mobile terminal. Therefore, even when the first encryption key leaks due to spoofing or the like, the first encryption key needed for the next unlocking or the like is updated in a case where the user holding the mobile terminal temporarily departs from the vehicle or the facility, and therefore, it is possible to further suppress unauthorized use of the vehicle or the facility by a malicious third party.

The locking and unlocking system according to the first aspect of the present disclosure may further include a server configured to communicate with the mobile terminal. The server may include a generation unit configured to generate the first authentication information; and a server transmission unit configured to transmit the first authentication information generated by the generation unit to the mobile terminal, and the mobile terminal may include a second terminal reception unit configured to receive the first authentication information from the server.

According to the first aspect of the present disclosure, since the generation of the first authentication information and the transmission of the first authentication information to the mobile terminal are performed by the server, the user of the mobile terminal can easily acquire the first authentication information, and it is possible to suppress unauthorized use of the vehicle or the facility by a malicious third party in the locking and unlocking system having a configuration in which the first authentication information is generated and transmitted to the mobile terminal by the server.

In the locking and unlocking system according to the first aspect of the present disclosure, the server may include a fifth storage unit configured to store the second decryption key. The server transmission unit may be configured to transmit a signal including the first authentication information and the second decryption key to the mobile terminal when the server transmission unit transmits the first authentication information, the second terminal reception unit may be configured to receive the signal including the first authentication information and the second decryption key from the server, and the fourth storage unit may be configured to store the second decryption key received by the second terminal reception unit.

According to the first aspect of the present disclosure, in a case where the first authentication information is transmitted from the server to the mobile terminal, the second decryption key capable of decrypting the first encryption key encrypted with the second encryption key is transmitted from the server to the mobile terminal. Therefore, the mobile terminal can acquire the second decryption key for decrypting the first encryption key encrypted with the second encryption key transmitted from the key unit together with the first authentication information.

The locking and unlocking system according to the first aspect of the present disclosure may further include a locking and unlocking device attached to the vehicle or the facility. The key unit may include a sixth storage unit configured to store second authentication information associated with the vehicle or the facility. The locking and unlocking device may include a locking and unlocking device reception unit configured to receive a second request signal including the second authentication information from the key unit; a second authentication unit configured to perform authentication of the key unit based on the second authentication information included in the second request signal in a case where the locking and unlocking device reception unit receives the second request signal; and a locking and unlocking controller provided in the locking and unlocking device and configured to unlock or lock a door of the vehicle or the facility in a case where the second authentication unit has succeeded in the authentication. The locking and unlocking processing unit may be configured to transmit the second request signal including the second authentication information to the locking and unlocking device as a process of unlocking or locking the door of the vehicle or the facility.

According to the first aspect of the present disclosure, the key unit (the locking and unlocking processing unit) can unlock or lock the door of the vehicle or the facility in response to the success of the authentication of the key unit based on the second authentication information in the locking and unlocking device by transmitting the second request signal including the second authentication information associated with the vehicle or the facility to the locking and unlocking device attached to the vehicle or the facility. Therefore, it is not needed for the first authentication information to be information associated with the vehicle such as information associated with the key unit, and even when the first authentication information that has not been used leaks, it is needed to further specify a correspondence relationship between the key unit and the vehicle or the facility (which key unit is present in which vehicle or which facility) in addition to a correspondence relationship between the first authentication information and the key unit, and it is possible to further suppress unauthorized use of the vehicle or the facility.

A second aspect of the present disclosure relates to a key unit that is provided in a vehicle or a facility and is configured to unlock or lock a door of the vehicle or the facility in response to a first request signal for requesting locking or unlocking of the vehicle or the facility, the first request signal being transmitted from a mobile terminal. The key unit includes a first key unit reception unit configured to receive predetermined first authentication information and the first request signal from the mobile terminal; a first authentication unit configured to perform authentication of the mobile terminal based on the first authentication information in a case where the first key unit reception unit has received the first authentication information; and a locking and unlocking processing unit configured to perform a process of unlocking or locking the door of the vehicle or the facility in a case where the first authentication unit has succeeded in the authentication of the mobile terminal and the first key unit reception unit has received the first request signal. The first authentication unit is configured to prohibit the authentication of the mobile terminal in a case where the first authentication unit has performed the authentication of the mobile terminal based on the first authentication information, and then, even when the first key unit reception unit has received the first authentication information.

According to the above aspects, it is possible to provide a locking and unlocking system and a key unit capable of suppressing unauthorized use of a vehicle or a facility based on intercepted authentication information even in a case where authentication information transmitted from a mobile terminal to the vehicle or the facility is intercepted.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 10 is a sequence diagram schematically illustrating an example of operations regarding a time synchronization process of the key unit and the center server, and an unlocking process of the key unit in the locking and unlocking system.

DETAILED DESCRIPTION OF EMBODIMENTS

Hereinafter, modes for carrying out the disclosure will be described with reference to the drawings.

First, a configuration of a locking and unlocking system 1 according to this embodiment will be described with reference to FIGS. 1 and 2.

Figure 1:
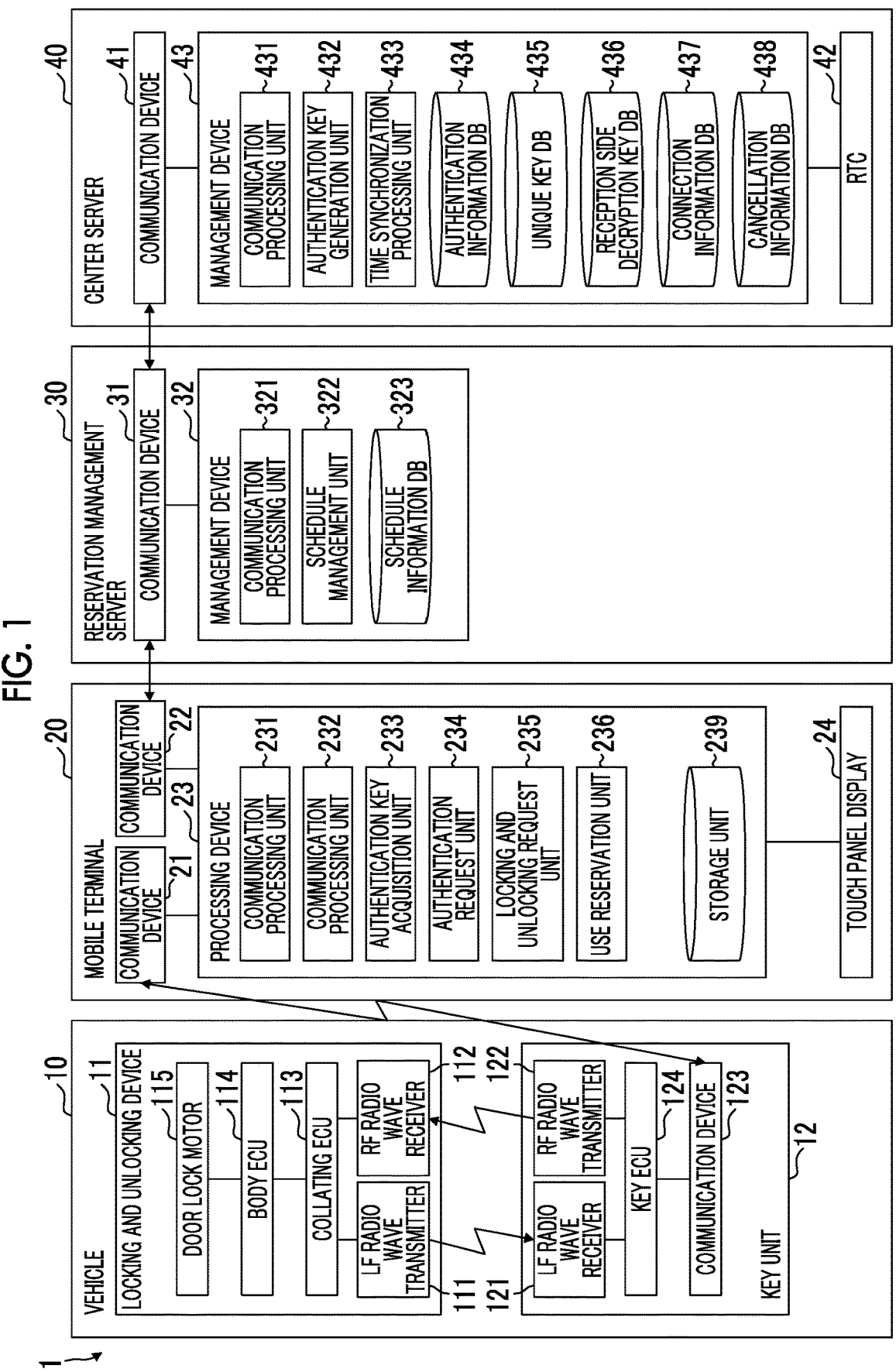
FIG. 1 is a block diagram schematically illustrating an example of a configuration of a locking and unlocking system.
Figure 2:
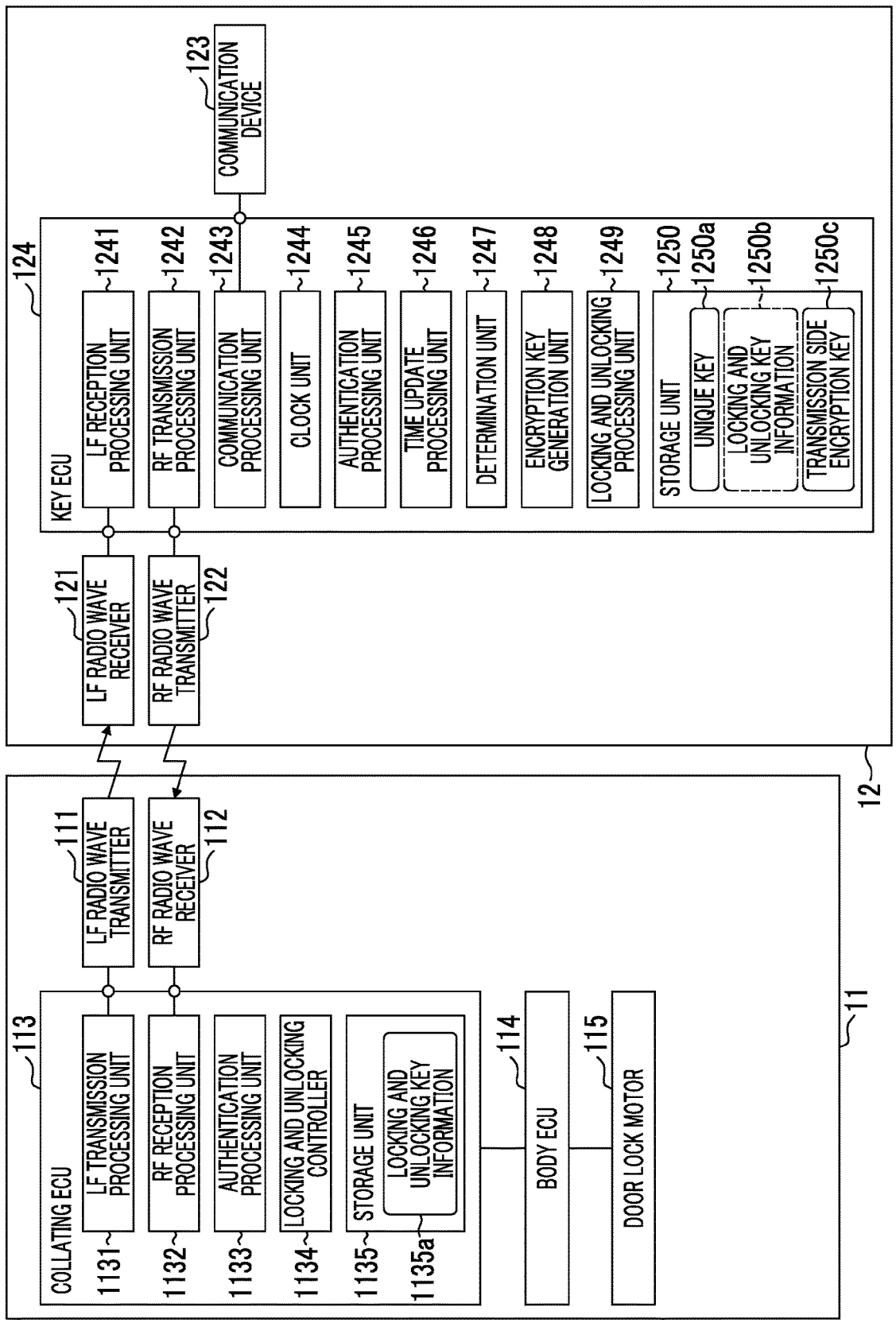
FIG. 2 is a block diagram schematically illustrating an example of a configuration of a locking and unlocking device and a key unit.

FIG. 1 is a block diagram schematically illustrating an example of a configuration of the locking and unlocking system 1 according to this embodiment. FIG. 2 is a block diagram schematically illustrating an example of the configuration of a locking and unlocking device 11 and a key unit 12 included in the vehicle 10.

The locking and unlocking system 1 includes a vehicle 10, a mobile terminal 20, a reservation management server 30, and a center server 40.

The vehicle 10 is a target of locking and unlocking (unlocking and locking) in the locking and unlocking system 1. The vehicle 10 includes a locking and unlocking device 11 and a key unit 12.

The vehicle 10 according to the embodiment is assumed to be a rental car that can be used by a plurality of users, a share car (whether the share car is provided by a business or is provided personally), a company car in an organization, or the like.

The locking and unlocking device 11 is attached to the vehicle 10, and performs unlocking and locking of the door of the vehicle 10 according to a locking signal and an unlocking signal (both of which are examples of a second request signal) that are transmitted as radio waves in a radio frequency (RF) band (for example, 300 MHz to 3 GHz) (hereinafter referred to as "RF radio waves") from the key unit 12. The locking and unlocking device 11 includes a low frequency (LF) radio wave transmitter 111, an RF radio wave receiver 112, a collating electronic control unit (ECU) 113, a body ECU 114, and a door lock motor 115.

The locking and unlocking device 11 operates with power that is supplied from an auxiliary battery (not illustrated) mounted on the vehicle 10.

The LF radio wave transmitter 111 is built into, for example, a center console or a door handle in a vehicle cabin, and transmits radio waves (hereinafter referred to as "LF radio waves") in an LF band (for example, 30 Hz to 300 kHz) under the control of the collating ECU 113 (an LF transmission processing unit 1131 to be described below).

The RF radio wave receiver 112 is provided, for example, in a trim of a luggage room of the vehicle 10, and receives RF radio waves under the control of a collating ECU 113 (an RF reception processing unit 1132 to be described below).

The collating ECU 113 is an electronic control unit that performs control of unlocking and locking of the door of the vehicle 10 according to the unlocking signal and the locking signal received from the key unit 12. For example, the collating ECU 113 mainly includes a microcomputer, and realizes various control processes by executing a program stored in the ROM on the CPU. The collating ECU 113 includes an LF transmission processing unit 1131, an RF reception processing unit 1132, an authentication processing unit 1133, and a locking and unlocking controller 1134 as functional units that are realized by executing one or more programs on the CPU. Further, the collating ECU 113 includes a storage unit 1135 that is realized as a storage area of an internal memory.

The LF transmission processing unit 1131 performs a process of transmitting the LF radio waves to the inside of the vehicle cabin and the outside of the vehicle cabin via the LF radio wave transmitter 111.

The RF reception processing unit 1132 (an example of a locking and unlocking device reception unit) performs a process of receiving RF radio waves via the RF radio wave receiver 112. Specifically, the RF reception processing unit 1132 receives the unlocking signal and the locking signal that are transmitted as RF radio waves from the key unit.

In a case where the RF reception processing unit 1132 receives the unlocking signal or the locking signal, the authentication processing unit 1133 (an example of a second authentication unit) performs authentication of a transmission source (the key unit 12) of the unlocking signal or the locking signal based on locking and unlocking key information (locking and unlocking key information 1250b to be described below) included in the unlocking signal or the locking signal. Specifically, in a case where locking and unlocking key information 1135a registered in the storage unit 1135 in advance matches the locking and unlocking key information included in the unlocking signal or the locking signal, the authentication processing unit 1133 determines that the authentication is successful. In a case where the locking and unlocking key information 1135a registered in the storage unit 1135 in advance does not match the locking and unlocking key information included in the unlocking signal or the locking signal, the authentication processing unit 1133 determines that the authentication fails.

In a case where the authentication processing unit 1133 has succeeded in the authentication, the locking and unlocking controller 1134 transmits an unlocking command (in a case where the RF reception processing unit 1132 receives the unlocking signal) or a locking command (in a case where the RF reception processing unit 1132 receives the locking signal) to the body ECU 114 over an in-vehicle network such as a controller area network (CAN).

The body ECU 114 is an electronic control unit that controls an operation of the door lock motor 115 that is communicatably connected via a one-to-one communication line or the like. In response to the unlocking command from the collating ECU 113, the body ECU 114 outputs a control command to cause the door lock motor 115 to perform the unlocking operation. In response to the locking command from the collating ECU 113, the body ECU 114 outputs a control command for causing the door lock motor 115 to perform the locking operation.

The door lock motor 115 is a known electric actuator that unlocks and locks the door (including a trunk lid, a back door, or the like) of the vehicle 10 in response to the control command from the body ECU 114.

The key unit 12 is disposed inside the vehicle 10 (inside the vehicle cabin), and transmits the unlocking signal and the locking signal to the locking and unlocking device 11 as RF radio waves in response to each of an unlocking request and a locking request (both of which are examples of a first request signal) that is transmitted from the mobile terminal 20. The key unit 12 includes an LF radio wave receiver 121, an RF radio wave transmitter 122, a communication device 123, and a key ECU 124.

The key unit 12 may be disposed at a position that is not visible (for example, the inside of a glove box of a center console box) from a user seated on each seat of the vehicle 10. Further, the key unit 12 may be fixed or may not be fixed to the vehicle 10. Further, the key unit 12 may be operated by a built-in button battery or the like, or may be operated with power supplied from an auxiliary battery mounted on the vehicle 10.

The LF radio wave receiver 121 performs a process of receiving the LF radio waves under the control of the key ECU 124 (an LF reception processing unit 1241 to be described below).

The RF radio wave transmitter 122 performs a process of transmitting the RF radio waves under the control of the key ECU 124 (an RF transmission processing unit 1242 to be described below).

The communication device 123 is an arbitrary device that performs communication with the mobile terminal 20 at a relatively short distance (a distance that allows communication between the inside of the vehicle cabin and the outside of the vehicle cabin) according to a predetermined communication standard under the control of the key ECU 124. The communication device 123 may be, for example, a Bluetooth (registered trademark) Low Energy (BLE) communication module that performs communication with the mobile terminal 20 in compliance with a BLE communication standard. Hereinafter, the description will be continued on the premise that the communication standard adopted by the communication device 123 conforms to the BLE communication.

The communication device 123 may be a communication device conforming to a short-range communication standard (for example, Near Field Communication (NFC) standard) having a very short communicatable distance. In this case, the communication device 123 may be built into at a position close to a body surface of the vehicle 10 outside the vehicle cabin (for example, inside the door handle) or the like. As described above, the key unit 12 (the key ECU 124) can communicate with the mobile terminal 20 outside the vehicle cabin even in a case where the communicatable distance of the communication device 123 is very short.

The key ECU 124 is an electronic control unit that performs a control process of transmitting the locking signal and the unlocking signal to the locking and unlocking device 11 in response to the unlocking request and the locking request received from the mobile terminal 20. The key ECU 124 mainly includes, for example, a microcomputer, and realizes various control processes by executing various programs stored in the ROM on the CPU. The key ECU 124 includes an LF reception processing unit 1241, an RF transmission processing unit 1242, a communication processing unit 1243, a clock unit 1244, an authentication processing unit 1245, a time update processing unit 1246, a determination unit 1247, an encryption key generation unit 1248, and a locking and unlocking processing unit 1249 as functional units that are realized by executing one or more programs on the CPU. Further, the key ECU 124 includes, for example, a storage unit 1250 (an example of a second storage unit, a third storage unit, and a sixth storage unit) realized as a storage area of an internal memory.

The LF reception processing unit 1241 performs a process of receiving the LF radio waves via the LF radio wave receiver 121. For example, the LF reception processing unit 1241 receives the LF radio waves that are transmitted from the locking and unlocking device 11.

The RF transmission processing unit 1242 performs a process of transmitting RF radio waves via the RF radio wave transmitter 122. For example, the RF transmission processing unit 1242 performs a process of transmitting the unlocking signal including the locking and unlocking key information 1250b (an example of second authentication information) to be described below (in a case where the communication processing unit 1243 receives the unlocking request) or the locking signal including the locking and unlocking key information 1250b (in a case where the communication processing unit 1243 receives the locking request) in response to a transmission request from the locking and unlocking processing unit 1249.

The communication processing unit 1243 (an example of a key unit reception unit or a key unit transmission unit) performs a communication process with the mobile terminal 20 via the communication device 123. For example, the communication processing unit 1243 receives an authentication request including an authentication key to be described below from the mobile terminal 20. Further, for example, the communication processing unit 1243 receives the unlocking request and the locking request from the mobile terminal 20.

As will be described below, the key unit 12 communicates with the center server 40 via the mobile terminal 20, but may also be configured to directly communicate with the center server 40. For example, the key unit 12 may be configured to be connected to a predetermined communication network including a mobile phone network or the Internet network via a data communication module (DCM) mounted on the vehicle 10 and be communicatable with the center server 40.

The clock unit 1244 performs clocking with software to generate a time in the key unit 12. The time in the clock unit 1244 has a relatively lower precision than, for example, a real time clock (RTC) as hardware. The time in the clock unit 1244 is updated with a time of the center server 40 (more specifically, a time of RTC 42 to be described below), as will be described below. That is, the time in the clock unit 1244 is synchronized with the time in the center server 40.

In a case where the communication processing unit 1243 receives an authentication request including an authentication key (an example of first authentication information) associated with the key unit 12 from the mobile terminal 20 that is a target, the authentication processing unit 1245 (an example of a first authentication unit) performs authentication of the mobile terminal 20 based on the authentication key. In a case where the communication processing unit 1243 receives, from the authenticated mobile terminal 20, a re-authentication request for requesting a reconnection through BLE communication with the key unit 12 from the mobile terminal 20, the authentication processing unit 1245 performs challenge response authentication (hereinafter referred to as "re-authentication") on the mobile terminal 20. Details of the authentication will be described below.

Further, in a case where the authentication is successful, the authentication processing unit 1245 performs a process of restoring the locking and unlocking key information 1250b stored in the storage unit 1250 to an available state. The locking and unlocking key information 1250b is stored in a state that the locking and unlocking key information 1250b cannot be used as an authentication purpose in the locking and unlocking device 11, for example, an inaccessible state or an encrypted state. Therefore, in a case where the authentication of the mobile terminal 20 is successful, the authentication processing unit 1245, for example, changes an access right of the storage unit 1250 for changing the locking and unlocking key information 1250b to an accessible state, or decrypts the encrypted locking and unlocking key information 1250b based on the authentication key. As described above, the RF transmission processing unit 1242 can access the locking and unlocking key information 1245b which is not normally accessible to the locking and unlocking device 11 to transmit the unlocking signal or the locking signal including the locking and unlocking key information 1250b or transmit the unlocking signal or the locking signal including the decrypted locking and unlocking key information 1250b. Therefore, the locking and unlocking device 11 (more specifically, the authentication processing unit 1133) can perform appropriate authentication based on the locking and unlocking key information 1250b included in the unlocking signal and the locking signal. Even when a situation in which a malicious third party obtains the key unit 12 in an unauthorized manner occurs, the locking and unlocking key information 1250b in the key unit 12 is not accessible or is encrypted, and therefore, it is possible to suppress robbery of the vehicle 10.

The time update processing unit 1246 sends a transmission request to the communication processing unit 1243 to transmit a time acquisition request for requesting acquisition of the time of the center server 40 to the center server 40 in an aspect in which the time update processing unit 1246 relays the mobile terminal 20 and the reservation management server 30 via the communication processing unit 1243. In a case where the communication processing unit 1243 receives the time information from the center server 40 by relaying the reservation management server 30 and the mobile terminal 20, the time update processing unit 1246 updates the time of the clock unit 1244 with the time information to be synchronized with the time of the center server 40 (that is, the time of the RTC 42 to be described below).

The determination unit 1247 determines whether or not the current time is within a reservation time of the vehicle 10 corresponding to the authentication key used for authentication in the authentication processing unit 1245. Further, the determination unit 1247 determines whether or not the reservation of the vehicle 10 corresponding to the authentication key used for authentication in the authentication processing unit 1245 has been canceled. Details thereof will be described below.

The encryption key generation unit 1248 generates a communication encryption key (an example of a first encryption key) that is used in a case where the mobile terminal 20 (that is, the authenticated mobile terminal 20) successfully authenticated by the authentication processing unit 1245 transmits a signal to the key unit 12. Further, the encryption key generation unit 1248 also generates a communication decryption key (an example of a first decryption key) for decrypting the data encrypted with the generated encryption key. The encryption key generation unit 1248 generates a communication encryption key so that the generated communication encryption key is different from a communication encryption key previously generated. As will be described below, the communication encryption key is transmitted to the key unit 12, and the communication decryption key is stored in the storage unit 1250. As described above, the mobile terminal 20 encrypts various commands (for example, an unlocking request or a locking request) with the communication encryption key with respect to the key unit 12 and then transmits the resultant commands to the key unit 12, such that the authentication processing unit 1245 does not need to perform the authentication of the mobile terminal 20 with the authentication key each time in response to the reception of various commands in the communication processing unit 1243. Therefore, as will be described below, the use of the authentication key can be restricted to one time, and for example, in a case where the communication processing unit 1243 has received the locking request and the unlocking request encrypted with the communication encryption key, that is, the unlocking request or the locking request that can be decrypted with the communication decryption key, the locking and unlocking processing unit 1249 can determine that the request is a command from the authenticated mobile terminal 20, and can perform the process of unlocking or locking the door of the vehicle 10. Details thereof will be described below.

In a case where the authentication processing unit 1245 has succeeded in the authentication of the mobile terminal 20 and the communication processing unit 1243 has received the unlocking request or the locking request from the mobile terminal 20, the locking and unlocking processing unit 1249 performs a process of locking or unlocking the door of the vehicle 10. Specifically, in a case where the authentication processing unit 1245 has succeeded in the authentication of the mobile terminal 20 and has received the unlocking request or the locking request that can be decrypted with the communication decryption key from the mobile terminal 20 as described above, the locking and unlocking processing unit 1249 performs a process of unlocking or locking the door of the vehicle 10 by sending the transmission request to the RF transmission processing unit 1242 to transmit the unlocking signal or the locking signal to the locking and unlocking device 11 via the RF transmission processing unit 1242 and the RF radio wave transmitter 122. Details thereof will be described below.

A unique key 1250*a*, the locking and unlocking key information 1250*b*, a transmission side encryption key 1250*c*, and the like are stored in the storage unit 1250 in advance.

The unique key 1250*a* is a set of an encryption key and a decryption key that are provided in an aspect in which the unique key 1250*a* is associated with the key unit 12 as will be described below. Specifically, the unique key 1250*a* is an encryption key and a decryption key for performing encryption of data on the transmission side and decryption of the encrypted data on the reception side when communication is performed between the key unit 12 and the center server 40. As will be described below, the same unique key as the unique key 1250*a* is also stored in a unique key DB 435 of the center server 40.

When the communication encryption key generated by the encryption key generation unit 1248 is transmitted from the key unit 12 to the mobile terminal 20, a transmission side encryption key 1250*c* (an example of a second encryption key) is used to encrypt the communication encryption key.

The mobile terminal 20 is, for example, a smartphone, a tablet terminal, or the like. The mobile terminal 20 can bidirectionally communicate with the reservation management server 30 and the center server 40 over a predetermined communication network (for example, a mobile phone network or an Internet network having a number of base stations as terminations). Hereinafter, description will be continued on the premise that transmission and reception of signals between the mobile terminal 20 and the center server 40 are performed via the reservation management server 30. The mobile terminal 20 includes communication devices 21 and 22, a processing device 23, and a touch panel display (hereinafter simply referred to as a display) 24.

In the embodiment, the mobile terminal 20 communicates with the center server 40 via the reservation management server 30, but a configuration in which the mobile terminal 20 bidirectionally communicates with the center server 40 directly over a predetermined communication network may be adopted.

The communication device 21 is an arbitrary device that performs communication with the mobile terminal 20 according to the same communication standard as that of the communication device 123. In the case of the embodiment, the communication device 21 is, for example, a BLE communication module, as described above.

The communication device 22 is an arbitrary device that performs communication with the reservation management server 30 and the center server 40 over a predetermined communication network.

The processing device 23 includes a CPU, an auxiliary storage device, and the like, and includes a communication processing unit 231, a communication processing unit 232, an authentication key acquisition unit 233, an authentication request unit 234, a locking and unlocking request unit 235, and a use reservation unit 236, as functional units realized by executing one or more programs on the CPU. Further, the processing device 23 includes a storage unit 239 (an example of a first storage unit and a fourth storage unit) realized as a storage area in the auxiliary storage device.

The communication processing unit 231 (an example of a terminal transmission unit or a first terminal reception unit) wirelessly communicates with the key unit 12 using the communication device 21 to perform transmission and reception of various signals. For example, in response to a transmission request from the authentication request unit 234, the communication processing unit 231 transmits an authentication request including an authentication key and a re-authentication request including a response to be described below to the key unit 12. Further, for example, in response to a request from the locking and unlocking request unit 235, the communication processing unit 231 transmits an unlocking request and a locking request to the key unit 12. Further, for example, in the embodiment, the key unit 12 and the center server 40 adopts a configuration for performing bidirectional communication via the mobile terminal 20, and the communication processing unit 231 sends a signal with the center server 40 as a destination from the key unit 12 to the communication processing unit 232 to transfer the signal to the reservation management server 30 or transmit a signal with the key unit 12 as a destination which is transmitted from the center server 40, which is sent from the communication processing unit 232, to the key unit 12.

The communication processing unit 232 (an example of a second terminal reception unit) performs wireless communication with a base station using the communication device 22, and transmits and receives various signals such as a data signal and a control signal. Specifically, the communication processing unit 232 transmits and receives various signals to and from the reservation management server 30 and the center server 40 over a predetermined communication network including a mobile phone network or an Internet network having a base station as a termination. For example, in the embodiment, the communication processing unit 232 transmits a signal of which the destination is the center server 40 to the center server 40 via the reservation management server 30. Since the above configuration is adopted, the communication processing unit 232 that is the transmission side may transmit a transmission signal including a destination information to the reservation management server 30, and the reservation management server 30 that is a reception side may be an aspect in which a prescribed type of signal among a plurality of types of signals transmitted from the mobile terminal 20 to the reservation management server 30 is automatically transferred to the center server 40. Further, for example, in the embodiment, as described above, the key unit 12 and the center server 40 adopt a configuration for performing bidirectional communication via the mobile terminal 20, and the communication processing unit 232 sends a signal with the key unit 12 as a destination transmitted from the center server 40, to the communication processing unit 231 via the reservation management server 30 to transfer the signal to the key unit 12 or transmit a signal with the center server 40 as a destination transmitted from the key unit 12, which is sent from the communication processing unit 231, to the reservation management server 30.

That is, the communication processing unit 231 and the communication processing unit 232 are examples of relay units that receive, from one of the center server 40 and the key unit 12, the signal transmitted from the one to the other, and transmit (transfer) the signal to the other side.

The authentication key acquisition unit 233 performs a process of displaying a GUI as an operation screen on the display 24 and acquiring the above-described authentication key from the center server 40 according to a predetermined operation of the user on the GUI of the display 24. Specifically, the authentication key acquisition unit 233 sends a transmission request to the communication processing unit 232 according to the predetermined operation of the user, to transmit an authentication key acquisition request for requesting the acquisition of the authentication key to the center server 40 via the communication processing unit 232. In a case where the communication processing unit 232 receives the authentication key replied from the center server 40 in response to the reception of the authentication key acquisition request, the authentication key acquisition unit 233 performs a process of storing the authentication key in the storage unit 239. In the embodiment, the user can acquire the authentication key in the mobile terminal 20 in advance, that is, before a start date and time of the reservation of the vehicle 10. Details thereof will be described below.

The authentication request unit 234 sends a transmission request to the communication processing unit 231 to transmit an authentication request for requesting authentication of the mobile terminal 20 serving as a remote operation unit for locking and unlocking the door of the vehicle 10 to the key unit 12 of the vehicle 10 via the communication processing unit 231. Further, the authentication request unit 234 sends a transmission request to the communication processing unit 231 to transmit a re-authentication request for requesting a reconnection with the key unit 12 again after the BLE communication between the authenticated mobile terminal 20 and the key unit 12 is blocked from a connected state once, for example, due to getting off from the vehicle 10, to the key unit 12 of the vehicle 10 via the communication processing unit 231. Details thereof will be described below.

The locking and unlocking request unit 235 displays a graphical user interface (GUI) serving as an operation screen on the display 24. In response to a predetermined operation on the GUI, the locking and unlocking request unit 235 sends a transmission request to the communication processing unit 231 to transmit an unlocking request including the authentication key or a locking request including the authentication key to the key unit 12 via the communication processing unit 231. Specifically, as will be described below, the locking and unlocking request unit 235 transmits the unlocking request and the locking request encrypted by the communication encryption key received from the mobile terminal 20 by the communication processing unit 231 and stored in the storage unit 239 to the key unit 12. For example, an unlocking button for requesting unlocking of the vehicle 10 and a locking button for requesting locking of the vehicle 10 are drawn in the GUI. A locking request is transmitted by touching the locking button, and an unlocking request is transmitted by touching the unlocking button. Details thereof will be described below.

An operation of the user for transmitting the locking request and the unlocking request to the key unit 12 may not be a touch operation on the display 24, and may be an operation with respect to an operation unit of hardware provided in the mobile terminal 20. In the case where the authentication key is not stored in the storage unit 239, the predetermined operation for transmitting the locking request and the unlocking request may be invalidated, or the locking request and the unlocking request may be transmitted in an aspect in which the authentication key is not included.

The use reservation unit 236 displays a GUI as an operation screen on the display 24 and performs a use reservation of the vehicle 10 according to a predetermined operation of the user with respect to the GUI of the display 24. For example, the use reservation unit 236 requests the reservation management server 30 to provide schedule information (current reservation situation) of the vehicle 10 via the communication processing unit 232. In this case, the use reservation unit 236 transmits a request including, for example, identification information (for example, vehicle index number (VIN)) unique to the vehicle 10 and a password to the reservation management server 30. The schedule information of the vehicle 10 stored in the reservation management server 30 (specifically, a schedule information DB 323 to be described below) includes reservation information (the start date and time and the end date and time of each use reservation, identification information of the user, or the like) of the vehicle 10. Further, the use reservation unit 236 display the schedule information (current reservation situation) of the vehicle 10 received from the reservation management server 30 on the display 24 via the communication processing unit 232. As described above, the user can confirm an available time according to the schedule information displayed on the display and can make a reservation in an available time slot (a time slot in which the reservation is not made) of the vehicle 10. Further, in a case where the user makes a reservation at a specific date and time, the use reservation unit 236 requests updating into the schedule information including newly input reservation information (a start date and time and an end date and time of each use reservation, identification information of the user, or the like) via the communication processing unit 232. As described above, the new use reservation by the user of the mobile terminal 20 is reflected in the schedule information of the vehicle 10 in the schedule information DB 323.

Further, the use reservation unit 236 cancels the reservation of the vehicle 10 according to a predetermined operation of the user on the GUI of the display 24. In a case where the user cancels the use reservation, the use reservation unit 236 requests deletion of schedule information including the canceled reservation information (the start date and time and the end date and time of the use reservation, identification information of the user, or the like). As described above, content of the canceled use reservation in the schedule information of the vehicle 10 in the schedule information DB 323 is deleted.

The user is not limited to another terminal other than the mobile terminal 20 and, more specifically, a mobile terminal, and can make a reservation for the vehicle 10 from a stationary terminal (for example, a desktop computer) or can cancel the reservation, and the use reservation and cancellation of the reservation of the vehicle 10 may also be performed from the other terminal described above.

The reservation management server 30 manages the schedule (the use reservation) of the vehicle 10. The reservation management server 30 includes, for example, a cloud application (not illustrated), and the user can perform creating and updating of the schedule information using the cloud application with the mobile terminal 20 or another terminal via a predetermined communication network such as a mobile phone network or an Internet network.

The schedule of the vehicle 10 indicates the use schedule (the use reservation) of the vehicle 10.

The reservation management server 30 includes a communication device 31 and a management device 32.

The communication device 31 is an arbitrary device that performs communication with the mobile terminal 20, the center server 40, or the like over a predetermined communication network.

The management device 32 is mainly configured of one or a plurality of computers, and includes a communication processing unit 321 and a schedule management unit 322 as functional units that are realized by executing one or more programs on the CPU. Further, the management device 32 includes a schedule information DB 323 stored in the internal auxiliary storage device, and schedule information of the vehicle 10 is included in the schedule information DB 323.

The communication processing unit 321 performs transmission and reception of various signals to and from the mobile terminal 20, the center server 40, or the like using the communication device 31. For example, the communication processing unit 321 receives a signal for requesting the disclosure of the schedule information of the vehicle 10 from the mobile terminal 20, and replies the mobile terminal 20 with the schedule information (reference data) of the vehicle 10 in response to the request from the schedule management unit 322 corresponding to the signal. Further, for example, the communication processing unit 321 receives a signal for requesting updating of the schedule information from the mobile terminal 20 and replies the mobile terminal 20 with a signal indicating updating completion in response to a request from the schedule management unit 322 corresponding to the signal. Further, for example, in response to the request from the schedule management unit 322, the communication processing unit 321 transmits a cancellation notification to be described below to the center server 40. In the embodiment, as described above, the configuration in which the communication between the mobile terminal 20 and the center server 40 is performed via the reservation management server 30 is adopted, and the communication processing unit 321 relays and receives a signal that is transmitted from the mobile terminal 20 (or the key unit 12) to the center server 40, transfers the received signal to the center server 40, and relays the signal that is transmitted from the center server 40 to the mobile terminal 20 (or the key unit 12) to transfer the signal to the mobile terminal.

The schedule management unit 322 manages, for example, the schedule information of the vehicle 10 stored in the schedule information DB 323 in response to various inputs of the user that have used the cloud application. In a case where the communication processing unit 321 receives a signal for requesting disclosure of the schedule information of the vehicle 10 from the mobile terminal 20 (another terminal in the case where the use reservation of the vehicle 10 is performed in the other terminal), the schedule management unit 322 first determines whether or not the access is a regular access based on, for example, the identification information (user ID) and the password included in the signal. In the case of regular access, the schedule management unit 322 extracts the schedule information of the vehicle 10 from the schedule information DB 323 and transmits the schedule information to the mobile terminal 20 (or another terminal) via the communication processing unit 321. Further, in a case where the communication processing unit 321 receives a signal including a request for updating the schedule information of the vehicle 10 from the mobile terminal 20 (or another terminal), the schedule management unit 322 updates the schedule information of the vehicle 10 in the schedule information DB 323 according to content of the request (that is, change content such as the added reservation information or the reservation information deleted by the cancellation of the reservation). Further, in a case where the reservation of the vehicle 10 is canceled via the mobile terminal 20 or another terminal, the schedule management unit 322 sends a transmission request to the communication processing unit 321 to transmit a cancellation notification including reservation information regarding the canceled reservation of the vehicle 10 (a start date and time and an end date and time of each use reservation, identification information of the user, or the like) to the center server 40 via the communication processing unit 321.

The center server 40 performs management of the use status of the vehicle 10. The center server 40 includes a communication device 41, a real time clock (RTC) 42, and a management device 43.

The communication device 41 is an arbitrary device that performs communication with the mobile terminal 20, the reservation management server 30, or the like over a predetermined communication network.

The RTC 42 performs clocking with hardware and generates a time in the center server 40. The time of the RTC has higher precision than the clock unit 1244 of the key unit 12 by software.

The RTC 42 may be provided inside the management device 43.

The management device 43 is mainly configured by one or a plurality of computers, and includes a communication processing unit 431, an authentication key generation unit 432, and a time synchronization processing unit 433, as functional units that are realized by executing one or more programs on the CPU. Further, the management device 43 includes an authentication information DB 434, a unique key DB 435, a reception side decryption key DB 436, a connection information DB 437, and a cancellation information DB 438 stored in the internal auxiliary storage device.

The communication processing unit 431 (an example of a server transmission unit) transmits and receives various signals to and from the mobile terminal 20 and the reservation management server 30 using the communication device 31.

In a case where the communication processing unit 431 receives the authentication key acquisition request from the mobile terminal 20 by relaying the reservation management server 30, the authentication key generation unit 432 (an example of a generation unit) generates the authentication key associated with the key unit 12 (that is, unique to the key unit 12). Further, each time the authentication key generation unit 432 generates the authentication key, the authentication key generation unit 432 generates unique identification information (issuance ID) associated with the generated authentication key. The authentication key is configured to include, for example, unique information (key unit unique information) defined for the key unit 12 in advance. Further, the authentication key is configured to include reservation information such as the start date and time and the end date and time of reservation of the vehicle 10 included in the authentication key acquisition request. That is, the authentication key generation unit 432 generates an authentication key associated with the key unit 12 and associated with the reservation content of the vehicle 10. The authentication key generation unit 432 sends a transmission request to the communication processing unit 431 to transmit the authentication key information including the generated authentication key to the mobile terminal 20 in an aspect in which authentication key generation unit 432 relays the reservation management server 30 via the communication processing unit 431.

The time synchronization processing unit 433 causes the communication processing unit 431 to synchronize the time of the key unit 12 (that is, the time of the clock unit 1244) with the time of the center server 40 (that is, the time of the RTC 42) in response to the time acquisition request received from the key unit 12 by relaying the mobile terminal 20 and the reservation management server 30. In a case where the communication processing unit 431 receives the time acquisition request, the time synchronization processing unit 433 decrypts data of the time acquisition request with the unique key corresponding to the key unit 12 (the decryption key in the set of the encryption key and the decryption key) which is stored in the unique key DB 435, acquires the time of the RTC 42, and generates the time information including the time. In this case, the time synchronization processing unit 433 generates time information including the cancellation flag F indicating the presence or absence of cancellation of the reservation of the vehicle 10 corresponding to the issuance ID of the authentication key included in the time acquisition request, and encrypts the generated time information with a unique key (the encryption key in the set of the encryption key and the decryption key) corresponding to the key unit 12. The time synchronization processing unit 433 sends a transmission request to the communication processing unit 431 to transmit the encrypted time information to the key unit 12 by relaying the reservation management server 30 and the mobile terminal 20 via the communication processing unit 431.

Key unit unique information included in a part of the authentication key generated by the authentication key generation unit 432 is stored in the authentication information DB 434 in an aspect in which the key unit unique information is associated with the identification information unique to the key unit 12.

A unique key (a set of the encryption key and the decryption key) corresponding to the key unit 12 is stored in the unique key DB 435 in an aspect in which the unique key is associated with the identification information unique to the key unit 12. The authentication key generation unit 432 encrypts the authentication key information including the generated authentication key with the unique key, and then transmits the authentication key information to the mobile terminal 20 via the communication processing unit 431.

The reception side decryption key DB 436 (an example of a fifth storage unit) stores a reception side decryption key (an example of a second decryption key) that is paired with the transmission side encryption key 1250c stored in the key unit 12 (the storage unit 1250) and is used to decrypt data encrypted with the transmission side encryption key 1250c. The reception side decryption key is transmitted to the mobile terminal 20 in an aspect in which the reception side decryption key is included in the authentication key information as will be described below.

Information (BLE connection information) for communicatably connecting the mobile terminal 20 to the key unit 12 is stored in the connection information DB 437 in an aspect in which the information is associated with the identification information unique to the key unit 12. The BLE connection information includes, for example, a device ID of the communication device 123 of the key unit 12, and a service UUID at the time of advertisement of the key unit 12.

Cancellation information of the reservation of the vehicle 10 corresponding to the issued authentication key already transmitted to the mobile terminal 20 is stored in the cancellation information DB 438 in an aspect in which the cancellation information is associated with the issuance ID of the issued authentication key. The cancellation information stored in the cancellation information DB 438 is generated based on the cancellation notification transmitted from the reservation management server 30 by the communication processing unit 431.

An operation from the reservation of the vehicle 10 in the locking and unlocking system 1 to the acquisition of the authentication key in the mobile terminal 20 will be described with reference to FIG. 3.

Figure 3:
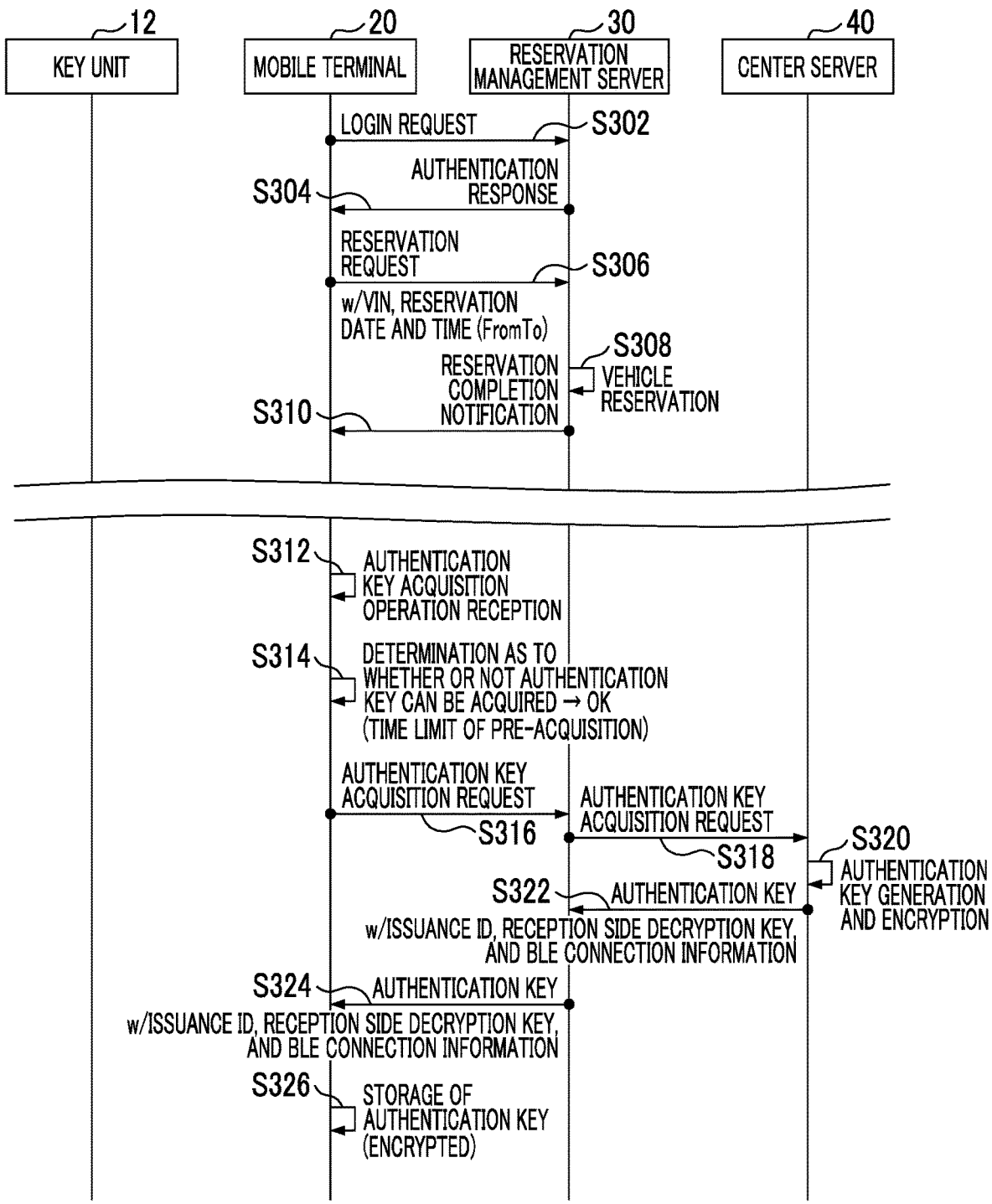
FIG. 3 is a sequence diagram schematically illustrating an example of an operation from a reservation of a vehicle to acquisition of an authentication key in a mobile terminal in a locking and unlocking system.

FIG. 3 is a sequence diagram schematically illustrating a series of operations from the reservation of the vehicle 10 in the locking and unlocking system 1 to the acquisition of the authentication key in the mobile terminal 20.

In step S302, the use reservation unit 236 of the mobile terminal 20 sends a transmission request to the communication processing unit 231 in response to the predetermined operation on the GUI of the display 24 (for example, an input operation of a user ID and a password preset for a user holding the mobile terminal 20), to transmit a login request including the user ID and the password to the reservation management server 30 via the communication processing unit 231.

In step S304, the schedule management unit 322 of the reservation management server 30 performs authentication as to whether the access is a regular access based on the user ID and the password of the login request received from the mobile terminal 20 via the communication processing unit 321, that is, user authentication, and transmits an authentication response to the mobile terminal 20 via the communication processing unit 321 when the user authentication is successful.

In step S306, the use reservation unit 236 of the mobile terminal 20 transmits a reservation request including, for example, identification information (VIN) of the vehicle 10, and a start date and time and an end date and time of the reservation to the reservation management server 30 via the communication processing unit 231 according to the predetermined operation of the user on the GUI of the display 24.

In step S308, the schedule management unit 322 of the reservation management server 30 updates the schedule information of the vehicle 10 stored in the schedule information DB 323 according to the content of the reservation request received by the communication processing unit 321, and completes the reservation of the vehicle 10.

In step S310, the schedule management unit 322 of the reservation management server 30 transmits a reservation completion notification to the mobile terminal 20 via the communication processing unit 321.

Thus, reservation of the vehicle 10 is completed in steps S302 to S310.

Thereafter, in step S312, the authentication key acquisition unit 233 of the mobile terminal 20 receives an authentication key acquisition operation of the user with respect to the GUI of the display 24.

In step S314, the authentication key acquisition unit 233 of the mobile terminal 20 determines whether or not the authentication key can be acquired. Specifically, the authentication key acquisition unit 233 determines whether or not a requirement regarding a time limit regarding pre-acquisition of the authentication key is satisfied, that is, whether or not the current time reaches a predetermined time before the start date and time of reservation of the vehicle 10 (for example, 10 minutes ago). In a case where the current time reaches the predetermined time before the start date and time of the reservation of the vehicle 10, the authentication key acquisition unit 233 proceeds to step S316. On the other hand, in a case where the current time does not reach the predetermined time before the start date and time of the reservation of the vehicle 10, the authentication key acquisition unit 233 invalidates the authentication key acquisition operation of the user and does not perform transmission of the authentication key acquisition request. By making it possible to previously acquire the authentication key before the start date and time of the reservation of the vehicle 10 as described above, for example, even in a case where the mobile terminal 20 is present outside the predetermined communication network at the start of use of the vehicle 10, the vehicle 10 can be unlocked and the use of the vehicle 10 can be started. Meanwhile, by providing a time limit in which the authentication key can be acquired (that is, the authentication key cannot be acquired unless it is after a predetermined point in time before the start date and time of the reservation of the vehicle 10), it is possible to restrict an opportunity to make unauthorized use of the vehicle 10 to before the start date and time of the reservation of the vehicle 10, for example, using the authentication key previously acquired by the user, and suppress unauthorized use of the vehicle 10 as described above.

In step S316, the authentication key acquisition unit 233 transmits an authentication key acquisition request including identification information (for example, a terminal ID) unique to the mobile terminal 20 via the communication processing unit 231, the VIN of the vehicle 10 that is a reservation target, and the start date and time and the end date and time of the reservation to the reservation management server 30.

In step S318, when the communication processing unit 321 of the reservation management server 30 receives the authentication key acquisition request from the mobile terminal 20, the communication processing unit 321 of the reservation management server 30 transfers the authentication key acquisition request to the center server 40.

In step S320, in response to the authentication key acquisition request received by the communication processing unit 431, the authentication key generation unit 432 of the center server 40 generates an authentication key associated with the reservation content of the key unit 12 and the vehicle 10 as described above, that is, an authentication key in an aspect in which the authentication key includes the key unit unique information, and the start date and time and the end date and time of the reservation of the vehicle 10. As described above, the authentication key generation unit 432 encrypts the authentication key with the unique key corresponding to the key unit 12, which is stored in the unique key DB 435.

In step S322, the authentication key generation unit 432 of the center server 40 transmits authentication key information including an issuance ID of the authentication key, the reception side decryption key, and the BLE connection information, in addition to the encrypted authentication key, to the reservation management server 30 via the communication processing unit 431.

In step S324, when the communication processing unit 321 of the reservation management server 30 receives the authentication key information from the center server 40, the communication processing unit 321 of the reservation management server 30 transfers the authentication key information to the mobile terminal 20.

In step S326, the authentication key acquisition unit 233 of the mobile terminal 20 stores the authentication key, the issuance ID, the reception side decryption key, and the BLE connection information included in the authentication key information received by the communication processing unit 231 in the storage unit 239.

Thus, the acquisition of the authentication key in the mobile terminal 20 is completed in steps S312 to S326.

An operation regarding authentication of the mobile terminal 20 in the locking and unlocking system 1 will be described with reference to FIGS. 4 to 6.

Figure 4:
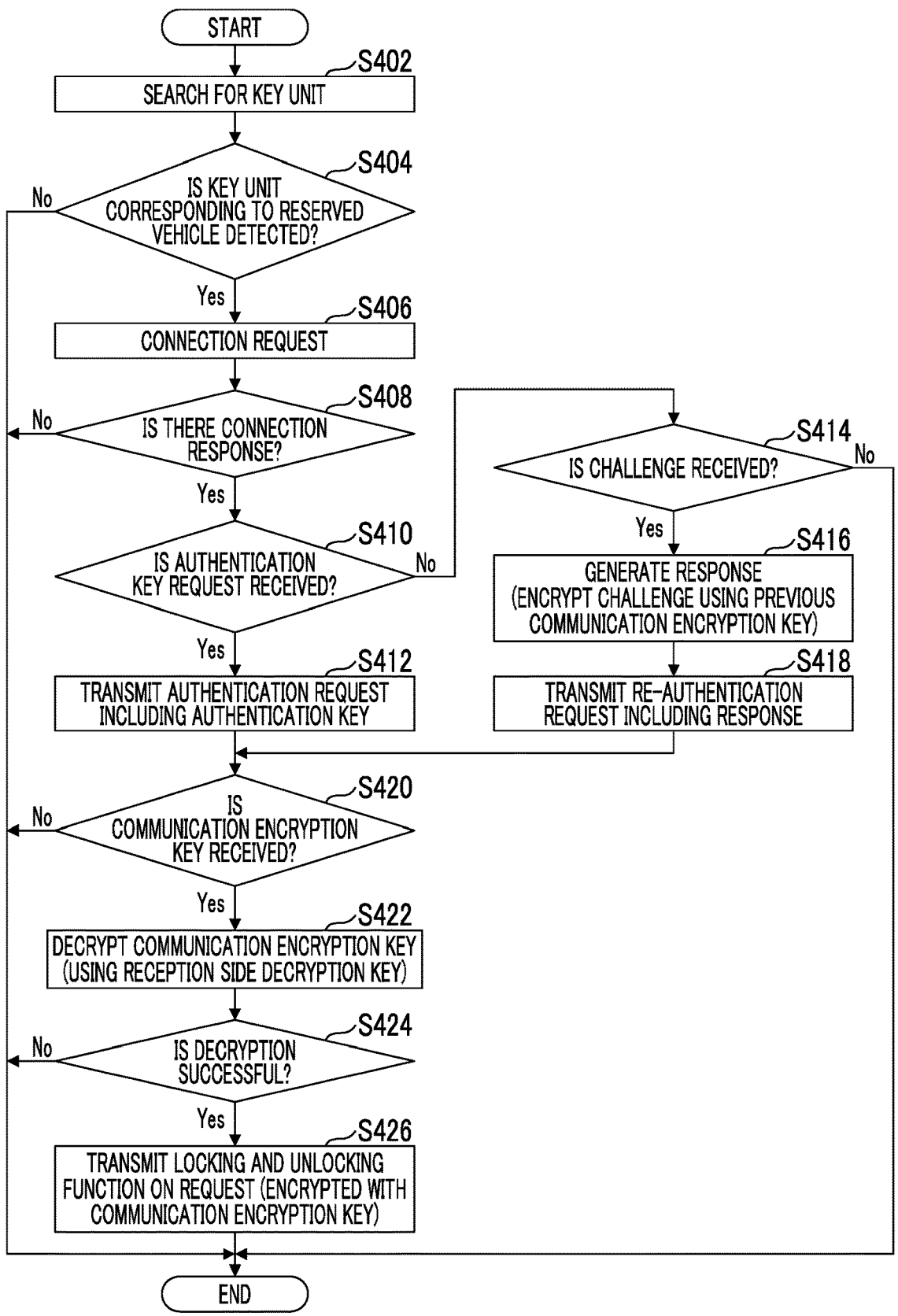
FIG. 4 is a flowchart schematically illustrating an example of a process (a locking and unlocking function startup process) of starting up a locking and unlocking function in a processing device of the mobile terminal.

First, FIG. 4 is a flowchart schematically illustrating an example of a process (locking and unlocking function startup process) of starting up the locking and unlocking function in the processing device 23 of the mobile terminal 20. The process according to the flowchart of FIG. 4 is performed at predetermined time intervals, for example, between acquisition of the authentication key and an end date and time of the reservation of the vehicle 10.

In step S402, the communication processing unit 231 searches for the key unit 12 corresponding to the reserved vehicle 10 within a communication area of the communication device 21 near the mobile terminal 20 based on the BLE connection information (a device ID, a service UUID, or the like) acquired from the center server in an aspect in which the BLE connection information is included in the authentication key information and stored in the storage unit 239.

In step S404, the communication processing unit 231 determines whether or not the key unit 12 (the communication device 123) corresponding to the reserved vehicle 10 has been detected. In a case where the communication processing unit 231 detects the key unit 12 corresponding to the reserved vehicle 10, the communication processing unit 231 proceeds to step S406 and, otherwise, ends this process.

In step S406, the communication processing unit 231 transmits a connection request including the identification information (for example, a terminal ID or a device ID of the communication device 21) of the mobile terminal 20.

In step S408, the communication processing unit 231 determines whether or not a connection response has been received from the key unit 12. In a case where the communication processing unit 231 receives the connection response from the key unit 12 within a predetermined time (for example, a time sufficiently longer than a maximum time assumed as a communication time from the mobile terminal 20 to the key unit 12) from the transmission of the connection request, the communication processing unit 231 proceeds to step S410, and in a case where the connection response is not received from the key unit 12 within the predetermined time from the transmission of the connection request, the communication processing unit 231 ends this process.

In step S410, the authentication request unit 234 determines whether or not the communication processing unit 231 has received an authentication key request from the key unit 12. In a case where the communication processing unit 231 has received the authentication key request from the key unit 12 within the predetermined time from the reception of the connection response in the communication processing unit 231, the authentication request unit 234 proceeds to step S412 and, otherwise, proceeds to step S414.

In step S412, the authentication request unit 234 transmits the authentication request including, for example, the authentication key (see step S326 in FIG. 3) encrypted by the center server 40 and stored in the storage unit 239 and the issuance ID of the authentication key to the key unit 12 via the communication processing unit 231, and proceeds to step S420.

Meanwhile, in step S414, the authentication request unit 234 determines whether or not the communication processing unit 231 has received a challenge regarding re-authentication of the mobile terminal 20 from the key unit 12. In a case where the communication processing unit 231 receives the challenge from the key unit 12 within a predetermined time from the reception of the connection response in the communication processing unit 231, the authentication request unit 234 proceeds to step S416 and, otherwise, ends this process.

In step S416, the authentication request unit 234 generates a response based on the challenge received by the communication processing unit 231. Specifically, the authentication request unit 234 encrypts the challenge using the communication encryption key received by the communication processing unit 231 at the time of previous authentication or re-authentication.

In step S418, the authentication request unit 234 transmits a re-authentication request including the generated response to the key unit 12, and proceeds to step S420.

In step S420, the authentication request unit 234 determines whether or not the communication processing unit 231 has received the communication encryption key from the key unit 12. In a case where the communication processing unit 231 has received the communication encryption key from the key unit 12 within a predetermined time from the transmission of the authentication request or the re-authentication request in the communication processing unit 231, the authentication request unit 234 proceeds to step S422 and, otherwise, ends this process.

In step S422, the authentication request unit 234 decrypts the communication encryption key received by the communication processing unit 231 using the reception side decryption key (see steps S324 and S326 in FIG. 3) stored in the storage unit 239.

In step S424, the authentication request unit 234 determines whether or not decryption of the communication encryption key received by the communication processing unit 231 has been successful. In a case where the authentication request unit 234 has succeeded in decryption of the received communication encryption key, the process proceeds to step S426, and otherwise, ends this process. As described above, for example, even when the communication encryption key encrypted with the transmission side encryption key 1250c transmitted from the key unit 12 to the mobile terminal 20 is intercepted by a malicious third party, the decryption cannot be performed without using the reception side decryption key that is acquired by the mobile terminal 20 together with the authentication key from the center server 40, and therefore, it is possible to suppress unauthorized use of the vehicle 10 through the interception of the communication encryption key.

The decrypted communication encryption key is stored in the storage unit 239.

In step S426, the authentication request unit 234 transmits a locking and unlocking function ON request encrypted with the communication encryption key to the key unit 12 via the communication processing unit 231, and ends this process.

Figure 5:
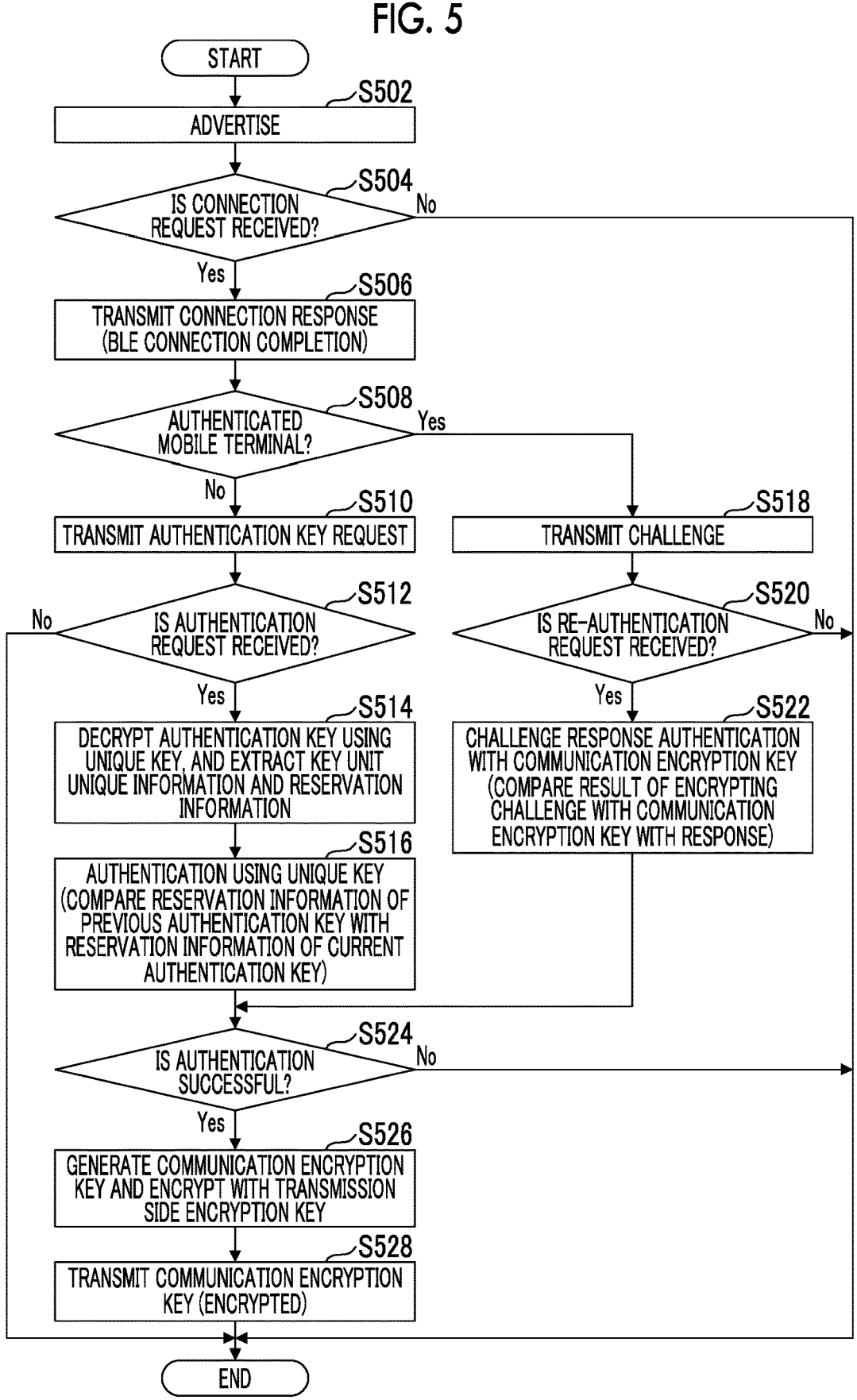
FIG. 5 is a flowchart schematically illustrating an example of a process of authenticating a mobile terminal in a key ECU of a key unit.

FIG. 5 is a flowchart schematically illustrating an example of a process of authenticating the mobile terminal 20 in the key ECU 124 of the key unit 12. The process according to the flowchart of FIG. 5 is repeatedly executed, for example, in a state in which there is no mobile terminal 20 communicatably connected to the key unit 12.

In step S502, the communication processing unit 1243 controls the communication device 123 and transmits advertisement information (for example, a service UUID or a device ID) to the vicinity of the vehicle 10 (specifically, within an arrival distance of the BLE communication radio waves around the communication device 123).

In step S504, the communication processing unit 1243 determines whether or not a connection request has been received from the mobile terminal 20. In a case where a connection request is received from the mobile terminal 20, the communication processing unit 1243 proceeds to step S506 and, otherwise, ends this process.

In step S506, the communication processing unit 1243 establishes a session for a BLE connection with the mobile terminal 20, and transmits a connection response indicating completion of the BLE connection to the mobile terminal 20.

In step S508, the authentication processing unit 1245 determines whether or not the mobile terminal 20 of which the session for a BLE connection has been established by the communication processing unit 1243 has been already authenticated with the authentication key based on the identification information of the mobile terminal 20 included in the connection request. In a case where the mobile terminal 20 has not been authenticated, the authentication processing unit 1245 proceeds to step S510, and in a case where the mobile terminal 20 has been already authenticated, the authentication processing unit 1245 proceeds to step S518.

In step S510, the authentication processing unit 1245 transmits the authentication key request to the mobile terminal 20 via the communication processing unit 1243.

In step S512, the authentication processing unit 1245 determines whether or not the communication processing unit 1243 has received the authentication request including an authentication key from the mobile terminal 20. In a case where the communication processing unit 1243 has received the authentication request from the mobile terminal 20 within a predetermined time from the transmission of the authentication key request in the communication processing unit 1243, the authentication processing unit 1245 proceeds to step S514 and, otherwise, ends this process.

In step S514, the authentication processing unit 1245 decrypts the authentication key encrypted by the center server 40 and included in the authentication request using the unique key 1250a, and extracts the key unit unique information and the reservation information (the start date and time and the end date and time of the reservation of the vehicle 10) included in the authentication key.

In step S516, the authentication processing unit 1245 performs authentication of the mobile terminal 20 based on the extracted key unit unique information and the extracted reservation information. For example, the authentication processing unit 1245 performs the authentication of the mobile terminal 20 based on, for example, whether or not the extracted key unit unique information matches the key unit unique information stored in the storage unit 1250 of the key unit 12 in advance, and whether or not there is duplication in the extracted reservation information (the start date and time and the end date and time) of the current authentication key and the reservation information (the start date and time and the end date and time) of the authentication key used for previous authentication. As described above, the authentication processing unit 1245 can perform not only the verification based on the key unit unique information unique to the key unit 12, but also verification of the presence or absence of duplication of the reservation information, and disable the authentication key already once used for authentication to be used again from a certain terminal irrespective of whether the terminal is the mobile terminal 20 that is an authentication target using the authentication key or another terminal. Therefore, for example, when the authentication request including the authentication key is transmitted from the mobile terminal 20 to the key unit 12, even in a case where the authentication key is intercepted by a malicious third party, reuse of the authentication key is not possible, and therefore, it is possible to suppress unauthorized use of the vehicle 10 by the malicious third party.

Meanwhile, in step S518, the authentication processing unit 1245 generates a challenge based on a predefined calculation equation or the like, and transmits the challenge to the mobile terminal 20 via the communication processing unit 1243.

In step S520, the authentication processing unit 1245 determines whether or not the communication processing unit 1243 has received a re-authentication request including a response from the mobile terminal 20. In a case where the communication processing unit 1243 has received the re-authentication request from the mobile terminal 20 within a predetermined time from the transmission of the challenge in the communication processing unit 1243, the authentication processing unit 1245 proceeds to step S522, and otherwise, ends this process.

In step S522, the authentication processing unit 1245 performs challenge response authentication with the communication encryption key used in the session of the previous BLE communication between the authenticated mobile terminal 20 and the key unit 12. Specifically, the authentication processing unit 1245 performs the re-authentication of the mobile terminal 20 according to whether the challenge encrypted with the previous communication encryption key matches the response that the communication processing unit 1243 has received from the mobile terminal 20.

In step S524, the authentication processing unit 1245 determines whether the authentication in step S516 or step S522 has been successful. In a case where the authentication has been successful, the authentication processing unit 1245 proceeds to step S526, and in a case where the authentication has failed, the authentication processing unit 1245 ends this process.

In step S526, the encryption key generation unit 1248 generates a communication encryption key and performs encryption with the transmission side encryption key 1250c.

In step S528, the authentication processing unit 1245 transmits the communication encryption key generated by the encryption key generation unit 1248 to the mobile terminal 20 via the communication processing unit 1243, and ends this process. As described above, the communication encryption key used for encryption in a case where the locking request or the unlocking request is transmitted from the mobile terminal 20 to the key unit 12 is updated each time a transition from a communication disabled state to a communication enabled state occurs between the mobile terminal 20 and the key unit 12. Therefore, for example, even when the communication encryption key leaks due to spoofing or the like, a connection to the key unit 12 using the communication encryption key cannot be made, and therefore, it is possible to further suppress unauthorized use of the vehicle 10 by a malicious third party.

Figure 6:
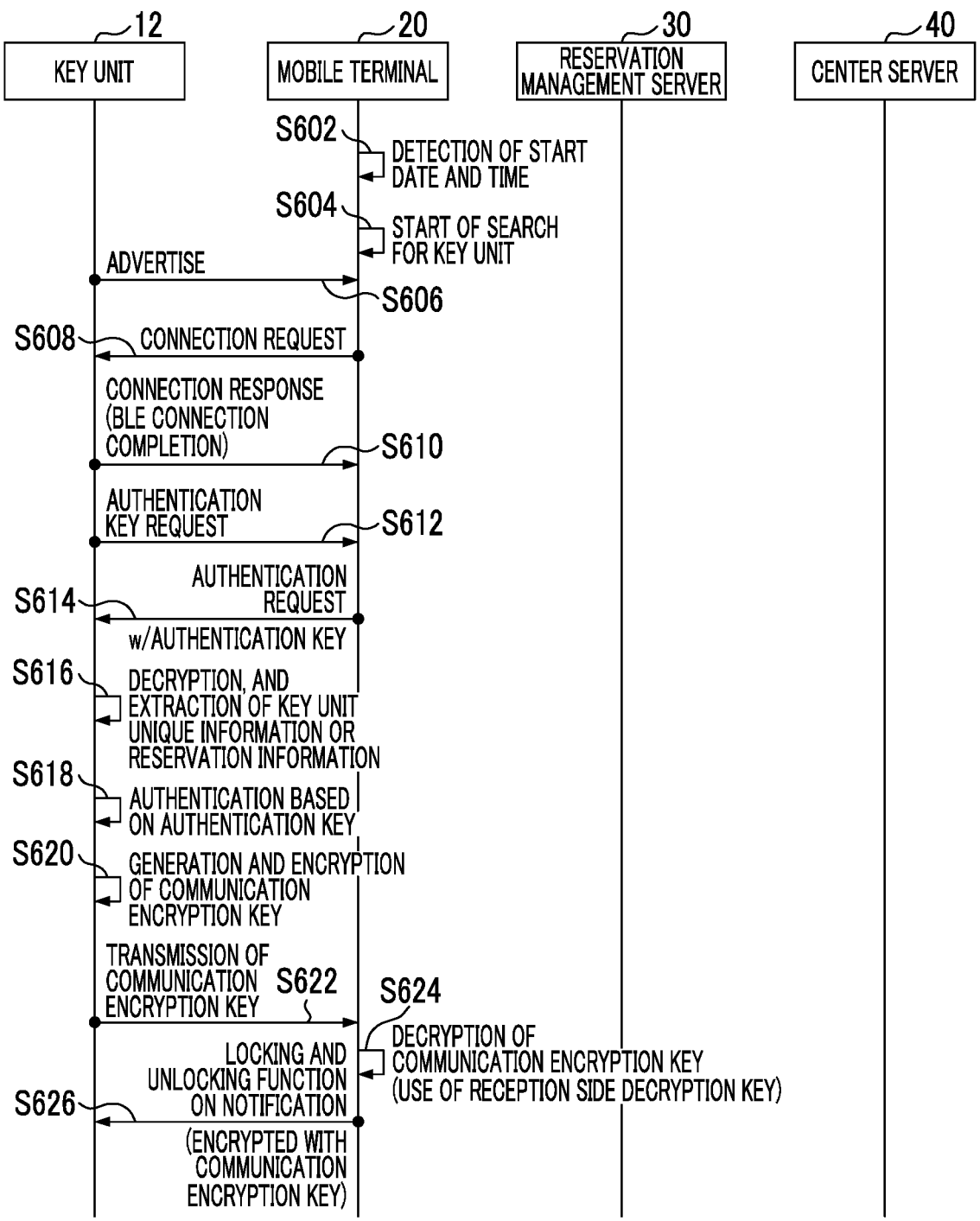
FIG. 6 is a sequence diagram schematically illustrating an example of an operation of a locking and unlocking system corresponding to a locking and unlocking function startup process of the mobile terminal and a process of authenticating the mobile terminal in the key unit.

FIG. 6 is a sequence diagram schematically illustrating an example of the operation of the locking and unlocking system 1 corresponding to the locking and unlocking function startup process in the mobile terminal 20 and the process of authenticating the mobile terminal 20 in the key unit 12.

In this example, the description will be given on the premise that the user holding the mobile terminal 20 has already arrived near the vehicle 10 at the start date and time of reservation of the vehicle 10.

In step S602, the communication processing unit 231 of the mobile terminal 20 detects the start date and time of reservation of the vehicle 10.

In step S604, the communication processing unit 231 of the mobile terminal 20 searches for the key unit 12 corresponding to the reserved vehicle 10 based on the BLE connection information stored in the storage unit 239 (step S402 in FIG. 4).

Meanwhile, in step S606, the communication processing unit 1243 of the key unit 12 transmits advertisement information to a predetermined communication area in the vicinity of the key unit 12 (that is, in the vicinity of the vehicle 10) via the communication device 123 (step S502 in FIG. 5).

In step S608, the communication processing unit 231 of the mobile terminal 20 detects the key unit 12 by receiving the advertisement information from the key unit 12, and transmits a connection request to the key unit 12 in response to the transmission request from the authentication request unit 234 (Yes in step S404, and step S406 in FIG. 4).

In step S610, the communication processing unit 1243 of the key unit 12 establishes a session of BLE communication with the mobile terminal 20 in response to the connection request received from the mobile terminal 20, and transmits a connection response to the mobile terminal 20 (Yes in step S504, and step S506 in FIG. 5).

In step S612, in a case where the mobile terminal 20 of which the session for BLE communication has been established has not been authenticated, the authentication processing unit 1245 of the key unit 12 transmits an authentication key request to the mobile terminal 20 via the communication processing unit 1243 (No in step S508, and step S510 in FIG. 5).

In step S614, in response to the authentication key request received by the communication processing unit 231, the authentication request unit 234 of the mobile terminal 20 transmits an authentication request including the authentication key encrypted in the center server 40 or the issuance ID of the authentication key to the key unit 12 via the communication processing unit 231 (Yes in step S410, and step S412 in FIG. 4).

In step S616, the authentication processing unit 1245 of the key unit 12 decrypts the encrypted authentication key included in the authentication key request received from the mobile terminal 20 by the communication processing unit 1243 using the unique key 1250a, and extracts the key unit unique information included in the authentication key or the reservation information of the vehicle 10 (step S514 in FIG. 5).

In step S618, the authentication processing unit 1245 of the key unit 12 performs the authentication of the mobile terminal 20 based on the authentication key and, more specifically, the authentication of the mobile terminal 20 based on the key unit unique information or the reservation information extracted from the authentication key (step S516 in FIG. 5).

In step S620, in a case where the authentication of the mobile terminal 20 is successful, the encryption key generation unit 1248 of the key unit 12 generates a communication encryption key and encrypts the communication encryption key with the transmission side encryption key 1250c (step S526 in FIG. 5).

In step S622, the authentication processing unit 1245 of the key unit 12 transmits the communication encryption key generated by the encryption key generation unit 1248 to the mobile terminal 20 (step S528 in FIG. 5).

In step S624, the authentication request unit 234 of the mobile terminal 20 decrypts the communication encryption key received by the communication processing unit 231 with the reception side decryption key stored in the storage unit 239 (step S422 in FIG. 4).

In step S626, in a case where the communication encryption key is successfully decrypted, the authentication request unit 234 transmits a locking and unlocking function ON notification encrypted with the communication encryption key to the key unit 12 via the communication processing unit 231.

As described above, the authentication of the mobile terminal 20 is completed in steps S602 to S626.

An operation regarding the unlocking of the door of the vehicle 10 using the mobile terminal 20 in the locking and unlocking system 1 will be described with reference to FIGS. 7 to 10.

Figure 7:
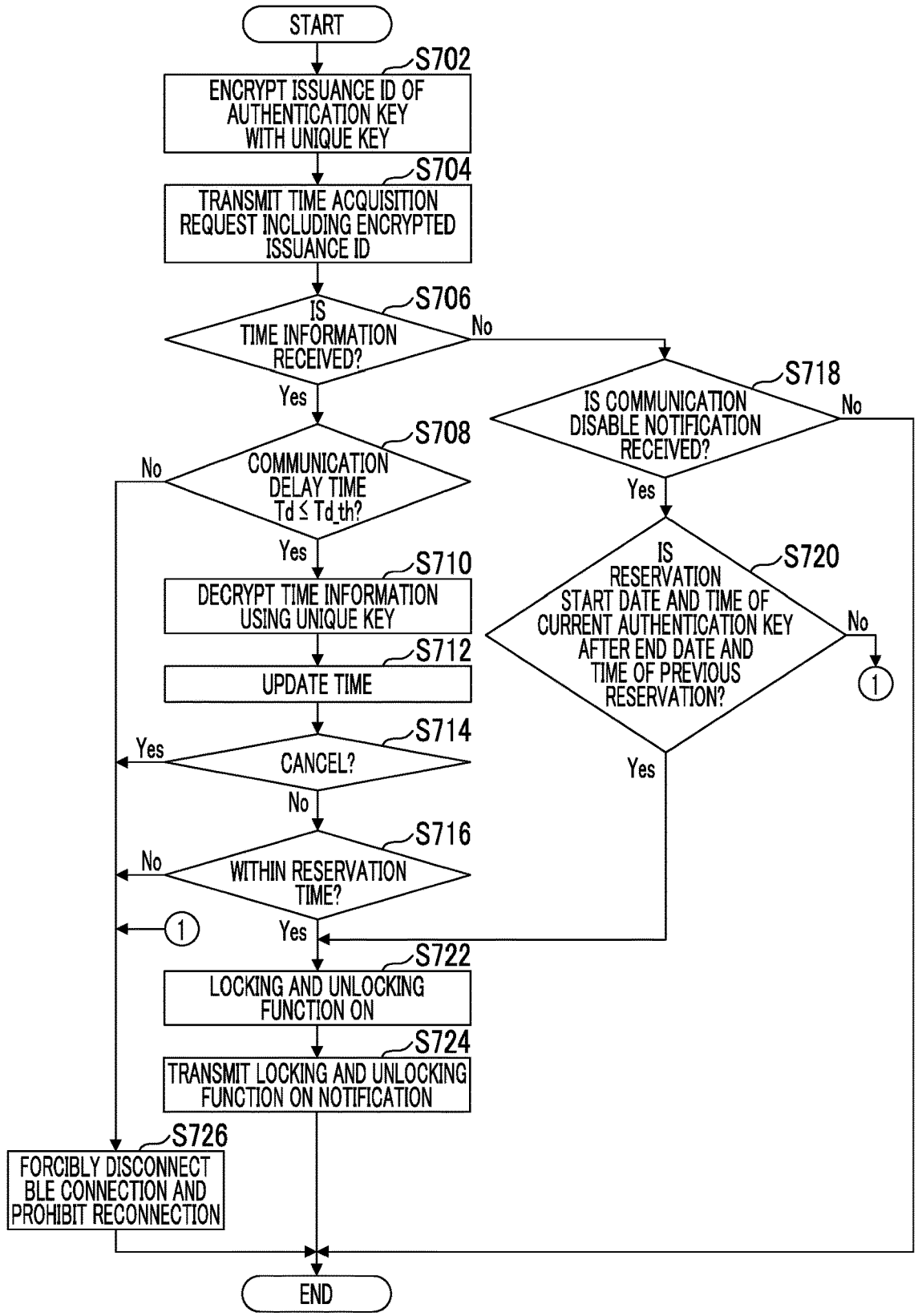
FIG. 7 is a flowchart schematically illustrating an example of a time update process in a key ECU of the key unit.

First, FIG. 7 is a flowchart schematically illustrating an example of a time update process in the key ECU 124 of the key unit 12. The process according to the flowchart of FIG. 7 is executed, for example, in a case where authentication or re-authentication of the mobile terminal 20 has been successful and the communication processing unit 1243 has received a locking and unlocking function ON request from the mobile terminal 20. Further, a process in which steps S722 and S724 to be described below are omitted from the flowchart of FIG. 7 is executed regularly (for example, every 30 minutes) in a situation where the state is continued in which a connection session of the BLE communication between the key unit 12 and the mobile terminal 20 is established after the authentication or re-authentication of the mobile terminal 20 has been successful.

In step S702, the time update processing unit 1246 encrypts the issuance ID of the authentication key used for authentication of the authenticated mobile terminal 20 with the unique key 1250a.

In step S704, the time update processing unit 1246 transmits the time acquisition request including the encrypted issuance ID to the center server 40 by relaying the mobile terminal 20 via the communication processing unit 1243.

In step S706, the time update processing unit 1246 determines whether or not the communication processing unit 1243 has received the time information from the center server 40 by relaying the mobile terminal 20. In a case where the communication processing unit 1243 has received the time information within a predetermined time from the transmission of the time acquisition request in the communication processing unit 1243, the time update processing unit 1246 proceeds to step S708 and, otherwise, proceeds to step S718.

In step S708, the time update processing unit 1246 determines whether or not an elapsed time (a communication delay time Td) from the transmission of the time acquisition request in the communication processing unit 1243 to the reception of the time information is equal to or smaller than a predetermined threshold value Td_th. The predetermined threshold value Td_th is set as a time during which a determination can be made as to whether or not there is an intentional communication delay in the mobile terminal 20 that relays time information from the center server 40 in advance. In a case where the communication delay time Td is equal to or smaller than the predetermined threshold value Td_th, the time update processing unit 1246 determines that there has been no intentional communication delay in the mobile terminal 20 or the like and proceeds to step S710. In a case where the communication delay time Td is not equal to or smaller than the predetermined threshold value Td_th, the time update processing unit 1246 determines that there has been the intentional communication delay in the mobile terminal 20 or the like and proceeds to step S726.

In step S710, the time update processing unit 1246 decrypts the time information received by the communication processing unit 1243 using the unique key 1250a.

In step S712, the time update processing unit 1246 synchronizes the time of the clock unit 1244 with the time of the center server 40 by updating the time of the clock unit 1244 with the time of the center server 40 (RTC 42) included in the decrypted time information.

In step S714, the determination unit 1247 determines whether or not the reservation of the vehicle 10 corresponding to the authentication key used for authentication of the authenticated mobile terminal 20 by the authentication processing unit 1245 has been canceled based on the cancellation flag F included in the decrypted time information. The determination unit 1247 determines that the reservation of the vehicle 10 corresponding to the authentication key used for the authentication of the authenticated mobile terminal 20 has been canceled in a case where the cancellation flag F included in the decrypted time information is "1", and determines that the reservation of the vehicle 10 has not been canceled in a case where the cancellation flag F is "0". The determination unit 1247 proceeds to step S716 in a case where the reservation of the vehicle 10 corresponding to the authentication key used for the authentication of the authenticated mobile terminal 20 by the authentication processing unit 1245 has not been canceled, and proceeds to step S726 in a case where the reservation of the vehicle 10 has been canceled.

In step S716, the determination unit 1247 determines whether or not the current time is within the reservation time of the vehicle 10. Specifically, the determination unit 1247 determines that the updated time of the clock unit 1244 is included between the start date and time and the end date and time of the reservation extracted from the authentication key at the time of authentication of the mobile terminal 20 by the authentication processing unit 1245. The determination unit 1247 proceeds to step S722 in a case where the determination unit 1247 determines that the current time is within the reservation time of the vehicle 10, and proceeds to step S726 in a case where the determination unit 1247 determines that the current time is not within the reservation time.

Meanwhile, in step S718, the time update processing unit 1246 determines whether or not the communication processing unit 1243 has received a communication disable notification from the mobile terminal 20. The communication disable notification is a notification that is transmitted from the mobile terminal 20 to the key unit 12, and indicates that the mobile terminal 20 cannot perform transmission and reception of signals to and from the reservation management server 30 and the center server 40, for example, since the mobile terminal 20 is outside a mobile phone network or a communication function of the mobile phone network is turned OFF. The time update processing unit 1246 cannot acquire the time information from the center server 40 in a case where the communication processing unit 1243 has received the communication disable notification from the mobile terminal 20 within a predetermined time from the transmission of the time acquisition request by the communication processing unit 1243, and therefore, the time of the clock unit 1244 is not updated, and the time update processing unit 1246 proceeds to step S720. Otherwise, the time update processing unit 1246 ends this process.

In step S720, the determination unit 1247 determines whether or not the current time is within the reservation time of the vehicle 10. However, since the communication between the mobile terminal 20 and the reservation management server 30 is disabled and the time of the clock unit 1244 cannot be synchronized with the time of the center server 40, a simple determination is performed. Specifically, the determination unit 1247 determines that the current time is within the reservation time of the vehicle 10 in a case where the start date and time of the reservation of the vehicle 10 corresponding to the current authentication key used for the authentication of the currently authenticated mobile terminal 20 is after the end date and time of the reservation of the vehicle 10 corresponding to the authentication key used for the authentication of the previously authenticated mobile terminal 20 based on a history of the reservation information (the start date and time and the end date and time of the reservation) of the vehicle 10 included in a history of the authentication key used for authentication of the mobile terminal 20 stored in the storage unit 1250, and otherwise, determines that the current time is not within the reservation time of the vehicle 10. In a case where the determination unit 1247 determines that the current time is within the reservation time of the vehicle 10, the determination unit 1247 proceeds to step S722. In a case where the determination unit 1247 determines that the current time is not within the reservation time of the vehicle 10, the determination unit 1247 proceeds to step S726.

In step S722, the locking and unlocking processing unit 1249 turns ON the locking and unlocking function.

In a case where the locking and unlocking function of the key unit 12 is OFF, the functions of the communication processing unit 1243 with relatively low power consumption, the clock unit 1244, the authentication processing unit 1245, the time update processing unit 1246, the determination unit 1247, the encryption key generation unit 1248, the locking and unlocking processing unit 1249, and the like enter an available state. Further, when the locking and unlocking function of the key unit 12 is switched from OFF to ON, for example, the LF radio wave receiver 121 and the RF radio wave transmitter 122 with relatively high power consumption enter an available state.

In step S724, the authentication processing unit 1245 transmits a locking and unlocking function ON notification indicating that the locking and unlocking function is ON to the mobile terminal 20 via the communication processing unit 1243, and ends this process.

Meanwhile, in step S726, the locking and unlocking processing unit 1249 forcibly disconnects the communication session of the BLE communication between the key unit 12 and the mobile terminal 20 by the communication processing unit 1243, and prohibits a subsequent reconnection of the mobile terminal 20. That is, unlocking of the vehicle 10 by the mobile terminal 20 is prohibited. As described above, in the process of transmitting the time information from the center server 40 to the key unit 12 through the process of step S708, in a case where a determination is made that intentional communication delay has occurred in the mobile terminal 20, communication between the mobile terminal 20 and the key unit 12 is blocked and the reconnection is disabled. Accordingly, for example, even when a malicious third party intentionally operates the time of the key unit 12 using the mobile terminal 20, and attempts unauthorized use in time other than the reservation time, it is possible to suppress the unauthorized use. In a case where a determination is made that the reservation of the vehicle 10 corresponding to the authentication key used for the authentication of the authenticated mobile terminal 20 is canceled through the process of step S714, the communication between the mobile terminal 20 and the key unit 12 is blocked and the reconnection is disabled. Therefore, for example, even in the case where the mobile terminal 20 holding the previously acquired authentication key has been passed to hands of a malicious third party, the use of the vehicle 10 by the malicious third party is prohibited by the user of the regular mobile terminal 20 canceling the reservation of the vehicle 10 using another terminal, telephone contact, or the like, and unauthorized use of the vehicle 10 can be suppressed. In a case where a determination is made that the current time is not within the reservation time of the vehicle 10 through the process of step S716, the communication between the mobile terminal 20 and the key unit 12 is blocked and reconnection is disabled. Therefore, for example, it is not possible to use the vehicle 10 before the start date and time of the reservation of the vehicle 10 using the previously acquired authentication key and it is possible to suppress unauthorized use of the vehicle 10. In a case where a determination is made in the process of step S720 that the current time is not within the reservation time of the vehicle 10, the communication between the mobile terminal 20 and the key unit 12 is blocked and the reconnection is disabled. Therefore, for example, even in a situation in which the time of the clock unit 1244 cannot be updated due to the mobile terminal 20 being outside the mobile phone network, it is possible to suppress a situation in which the vehicle 10 is used at least before an end date and time of a reservation immediately before the above reservation.

Figure 8:
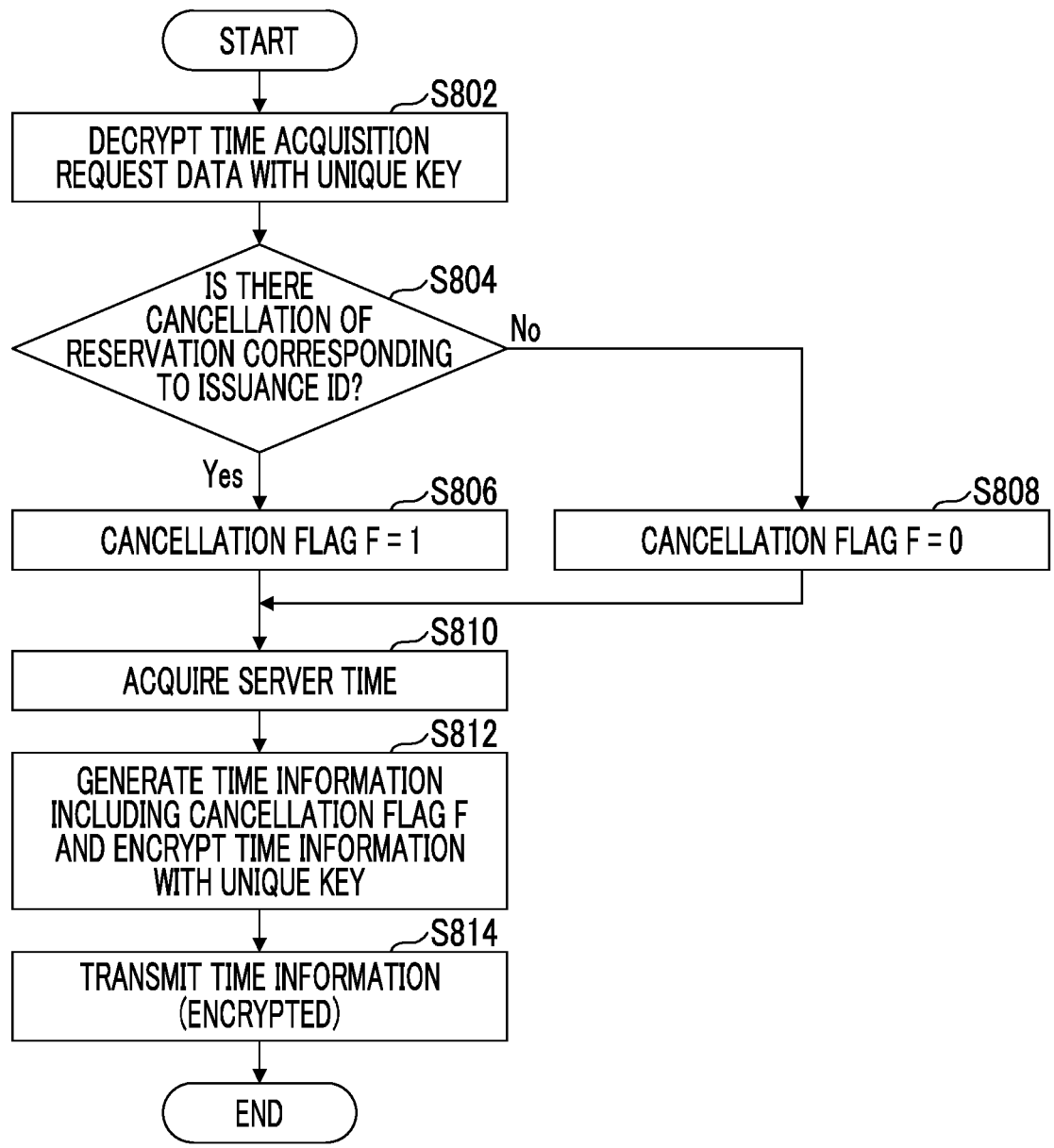
FIG. 8 is a flowchart schematically illustrating an example of a time update process in a management device of a center server.

FIG. 8 is a flowchart schematically illustrating an example of a time update process in the management device 43 of the center server 40. The process according to the flowchart of FIG. 8 is executed, for example, in a case where the communication processing unit 431 receives a time acquisition request from the key unit 12 by relaying the reservation management server 30.

In step S802, the time synchronization processing unit 433 decrypts the data of the time acquisition request received by the communication processing unit 431 with the unique key corresponding to the key unit 12 that is a transmission source stored in the unique key DB 435.

In step S804, the time synchronization processing unit 433 refers to the cancellation information DB 438 to determine whether there is cancellation of the reservation of the vehicle 10 corresponding to the issuance ID of the authentication key included in the decrypted time acquisition request. In a case where the reservation of the vehicle 10 corresponding to the issuance ID of the authentication key included in the time acquisition request is canceled, the time synchronization processing unit 433 proceeds to step S806, and in a case where there is no cancellation, the time synchronization processing unit 433 proceeds to step S808.

In step S806, the time synchronization processing unit 433 sets the cancellation flag F to "1" indicating that the reservation of the vehicle 10 is canceled, and proceeds to step S810.

On the other hand, in step S808, the time synchronization processing unit 433 sets the cancellation flag F to "0" indicating that the reservation of the vehicle 10 is not canceled, and proceeds to step S810.

In step S810, the time synchronization processing unit 433 acquires the time of the center server 40, that is, the time of the RTC 42.

In step S812, the time synchronization processing unit 433 generates time information including the acquired time of the center server 40 and the cancellation flag F, and encrypts the time information with the unique key corresponding to the key unit 12 that is a transmission source of the time acquisition request, which has been stored in the unique key DB 435.

In step S814, the time synchronization processing unit 433 transmits the encrypted time information to the key unit 12 in an aspect in which the time synchronization processing unit 433 relays the reservation management server 30 and the mobile terminal 20 via the communication processing unit 431, and ends this process. As described above, since the cancellation flag F is transmitted together with the time from the center server 40 each time the time acquisition request is transmitted from the key unit 12 to the center server 40 by relaying the mobile terminal 20 and the reservation management server 30 in a state in which communication between the mobile terminal 20 and the key unit 12 is possible, it is possible for the key unit 12 to recognize whether the reservation of the vehicle 10 is canceled or not.

Figure 9:
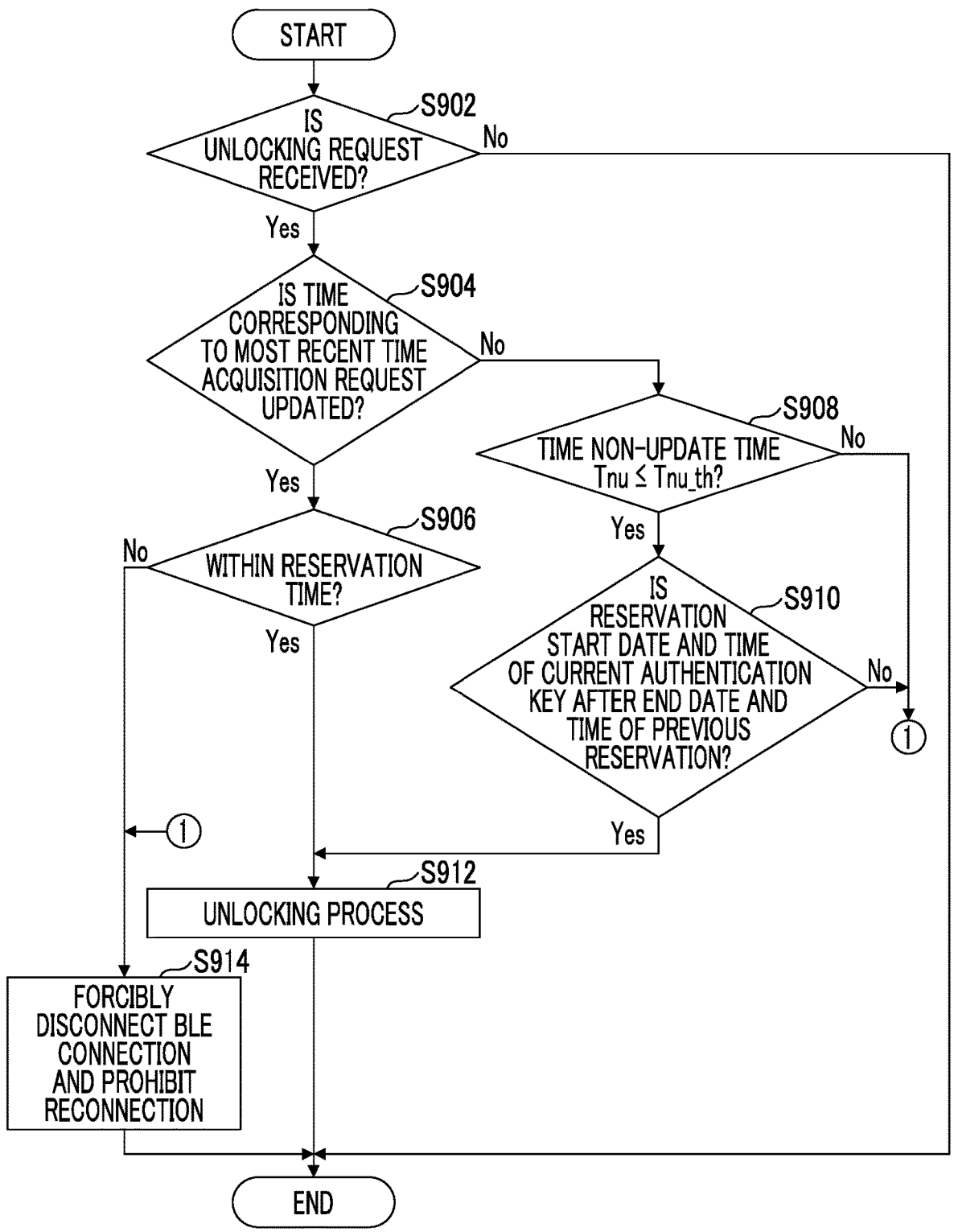
FIG. 9 is a flowchart schematically illustrating an example of an unlocking process in the key ECU of the key unit.

FIG. 9 is a flowchart schematically illustrating an example of an unlocking process in the key ECU 124 of the key unit 12. The process according to the flowchart of FIG. 9 is executed repeatedly at predetermined time intervals, for example, in a state in which the locking and unlocking function is ON.

In step S902, the locking and unlocking processing unit 1249 determines whether or not the communication processing unit 1243 has received the unlocking request encrypted with the communication encryption key from the mobile terminal 20. In a case where the communication processing unit 1243 has received the unlocking request encrypted with the communication encryption key from the mobile terminal 20, the locking and unlocking processing unit 1249 proceeds to step S904 and, otherwise, ends this process.

In step S904, the locking and unlocking processing unit 1249 determines whether or not the time of the clock unit 1244 corresponding to the most recent time acquisition request has been updated. In a case where the time of the clock unit 1244 corresponding to the most recent time acquisition request has been updated, the process proceeds to step S906. In a case where the time of the clock unit 1244 corresponding to the most recent time acquisition request has not been updated, the process proceeds to step S908.

In step S906, the determination unit 1247 determines whether or not the current time is within the reservation time of the vehicle 10 corresponding to the authentication key used for authentication of the mobile terminal 20. Specifically, the determination unit 1247 determines whether or not the time of the clock unit 1244 is included between the start date and time and the end date and time of the reservation information included in the authentication key. In a case where the current time is within the reservation time of the vehicle 10 corresponding to the authentication key used for authentication of the mobile terminal 20, the determination unit 1247 proceeds to step S912, and in a case where the current time is not within the reservation time, the determination unit 1247 proceeds to step S914.

Meanwhile, in step S908, the locking and unlocking processing unit 1249 determines whether or not the time (time non-update time) Tnu during which the time of the clock unit 1244 is not updated is equal to or smaller than a predetermined threshold value Tnu_th. In a case where the time non-update time Tnu of the clock unit 1244 is equal to or smaller than the predetermined threshold value Tnu_th, the locking and unlocking processing unit 1249 proceeds to step S910. In a case where the time non-update time Tnu of the clock unit 1244 is not equal to or smaller than the predetermined threshold value Tnu_th, the locking and unlocking processing unit 1249 proceeds to step S914.

In step S910, the determination unit 1247 determines whether or not the current time is within the reservation time of the vehicle 10. However, since the communication between the mobile terminal 20 and the reservation management server 30 is disabled and the time of the clock unit 1244 cannot be synchronized with the time of the center server 40, a simple determination is performed. Specifically, the determination unit 1247 determines that the current time is within the reservation time of the vehicle 10 in a case where the start date and time of the reservation of the vehicle 10 corresponding to the current authentication key used for the authentication of the currently authenticated mobile terminal 20 is after the end date and time of the reservation of the vehicle 10 corresponding to the authentication key used for the authentication of the previously authenticated mobile terminal 20 based on a history of the reservation information (the start date and time and the end date and time of the reservation) of the vehicle 10 included in a history of the authentication key used for authentication of the mobile terminal 20 stored in the storage unit 1250, and otherwise, determines that the current time is not within the reservation time of the vehicle 10. In a case where the determination unit 1247 determines that the current time is within the reservation time of the vehicle 10, the determination unit 1247 proceeds to step S912. In a case where the determination unit 1247 determines that the current time is not within the reservation time of the vehicle 10, the determination unit 1247 proceeds to step S914.

In step S912, the locking and unlocking processing unit 1249 performs the process of unlocking the door of the vehicle 10. That is, the locking and unlocking processing unit 1249 transmits the unlocking signal to the locking and unlocking device 11 via the RF transmission processing unit 1242 to unlock the door of the vehicle 10.

Meanwhile, in step S914, the communication processing unit 1243 forcibly disconnects the communication session of the BLE communication between the key unit 12 and the mobile terminal 20, and prohibits a subsequent reconnection of the mobile terminal 20. That is, unlocking of the vehicle 10 by the mobile terminal 20 is prohibited. As described above, the same operation and effect as in the case of the processing of step S726 in FIG. 7 can be obtained. That is, for example, it is impossible to use the vehicle 10 before the start date and time of the reservation of the vehicle 10 by using a previously acquired authentication key, and it is possible to suppress unauthorized use of the vehicle 10. Further, for example, even in a situation in which the time of the clock unit 1244 cannot be updated due to the mobile terminal 20 being outside the mobile phone network, it is possible to suppress a situation in which the vehicle 10 is used at least before an end date and time of a reservation immediately before the above reservation. Further, in this example, in a case where the time non-update time Tnu of the key unit 12 (the clock unit 1244) exceeds the predetermined threshold value Tnu_th through the process of step S908, the communication between the mobile terminal 20 and the key unit 12 is blocked and the reconnection is disabled. Therefore, for example, in a case where the user intentionally turns off the communication function of the communication processing unit 232 of the mobile terminal 20 and tries to continue to use the vehicle 10 in a state in which the time of the key unit 12 is not synchronized with the time of the center server 40, it is possible to suppress the unauthorized use of the vehicle 10 by setting the predetermined threshold value Tnu_th as a time limit for the time non-update time Tnu.

In a case where the communication processing unit 1243 receives the locking signal from the mobile terminal 20, the locking and unlocking processing unit 1249 may be configured to omit the processes of steps S904 to S910 and S914 in FIG. 9 and perform a process of locking the door of the vehicle 10, that is, transmit the locking signal to the locking and unlocking device 11 via the RF transmission processing unit 1242. This is because the locking of the vehicle 10 is considered to indicate a situation in which the user gets off the vehicle 10 and departs from the vehicle 10, and therefore, it is considered that it is better to permit the use even when the unauthorized use of the vehicle 10 is suspected. However, even in a case where the communication processing unit 1243 receives the locking signal from the mobile terminal 20, the same process as in FIG. 9 may be performed.

FIG. 10 is a sequence diagram schematically illustrating an example of operations regarding a time synchronization process of the key unit 12 and the center server 40 in the locking and unlocking system 1 and an unlocking process of the key unit 12.

The operation of the locking and unlocking system 1 in the sequence diagram illustrated in FIG. 10 will be described on the premise that the operation is continuously executed from the operation shown in the sequence diagram illustrated in FIG. 6.

In step S1002, the time update processing unit 1246 of the key unit 12 encrypts the issuance ID of the authentication key used for authentication of the authenticated mobile terminal 20 (step S702 in FIG. 7).

In step S1004, the time update processing unit 1246 of the key unit 12 transmits a time acquisition request including the encrypted issuance ID to the mobile terminal 20 via the communication processing unit 1243 (step S704 in FIG. 7).

In step S1006, when the communication processing unit 231 of the mobile terminal 20 receives the time acquisition request with the center server 40 as a transmission destination from the key unit 12, the communication processing unit 231 of the mobile terminal 20 sends the time acquisition request to the communication processing unit 232, and the communication processing unit 232 transfers the time acquisition request to the reservation management server 30.

In step S1008, when the communication processing unit 321 of the reservation management server 30 receives the time acquisition request with the center server 40 as a transmission destination from the mobile terminal 20, the communication processing unit 321 of the reservation management server 30 transfers the time acquisition request to the center server 40.

In step S1010, the time synchronization processing unit 433 of the center server 40 decrypts the data of the time acquisition request received by the communication processing unit 431 (step S802 in FIG. 8).

In step S1012, the time synchronization processing unit 433 of the center server 40 collates the issuance ID of the authentication key included in the time acquisition request with the cancellation information of the cancellation information DB 438, and sets the cancellation flag F (steps S804 to S808 in FIG. 8).

In step S1014, the time synchronization processing unit 433 of the center server 40 acquires the time of the center server 40 (RTC 42) (step S810 in FIG. 8).

In step S1015, the time synchronization processing unit 433 generates the time information including the time of the center server 40 and the cancellation flag F, and encrypts the time information with the unique key (step S812 in FIG. 8).

In step S1016, the time synchronization processing unit 433 transmits the encrypted time information to the reservation management server 30 via the communication processing unit 431 (step S814 in FIG. 8).

In step S1018, when the communication processing unit 321 of the reservation management server 30 receives the time information directed to the key unit 12 from the center server 40, the communication processing unit 321 of the reservation management server 30 transfers the time information to the mobile terminal 20.

In step S1020, when the communication processing unit 232 of the mobile terminal 20 receives the time information directed to the key unit 12 from the reservation management server 30, the communication processing unit 232 of the mobile terminal 20 sends the time information to the communication processing unit 231, and the communication processing unit 231 transfers the time information to the key unit 12.

In step S1021, in a case where the time information is received by the communication processing unit 1243, the time update processing unit 1246 of the key unit 12 confirms the restriction requirement regarding the communication delay time Td (whether or not the communication delay time Td is equal to or smaller than a predetermined threshold value Td_th) (step S708 in FIG. 7).

In a case where the communication delay time Td is equal to or smaller than the predetermined threshold value Td_th (Yes in step S708 in FIG. 7), the time update processing unit 1246 decrypts the time information with the unique key 1250a in step S1022 (step S710 in FIG. 7).

In step S1024, the time update processing unit 1246 of the key unit 12 updates the time of the clock unit 1244 with the time of the center server 40 (RTC 42) included in the decrypted time information (step S712 in FIG. 7).

In step S1026, the determination unit 1247 of the key unit 12 confirms the cancellation flag F included in the decrypted time information, and determines whether or not the reservation of the vehicle 10 corresponding to the authenticated mobile terminal 20 has been canceled (step S714 in FIG. 7).

In a case where the reservation of the vehicle 10 corresponding to the authenticated mobile terminal 20 has not been canceled (No in step S714 in FIG. 7), the determination unit 1247 of the key unit 12 confirms the reservation information (the start date and time and the end date and time of the reservation of the vehicle 10) included in the authentication key corresponding to the authenticated mobile terminal 20 and determines whether or not the current time is within the reservation time of the vehicle 10 in step S1028 (step S716 in FIG. 7).

In a case where the current time is within the reservation time of the vehicle 10 (Yes in step S716 in FIG. 7), the locking and unlocking processing unit 1249 turns on the locking and unlocking function in step S1030 (step S722 in FIG. 7).

In step S1032, the locking and unlocking processing unit 1249 transmits a locking and unlocking function ON notification to the mobile terminal 20 via the communication processing unit 1243 (step S724 in FIG. 7).

In step S1034, the locking and unlocking request unit 235 of the mobile terminal 20 receives a predetermined operation (an unlocking operation) of the user on the GUI of the display 24.

In step S1036, in response to the unlocking operation, the locking and unlocking request unit 235 of the mobile terminal 20 transmits an unlocking request encrypted with the communication encryption key stored in the storage unit 239 to the key unit 12 via the communication processing unit 231.

In step S1038, when the unlocking request is received by the communication processing unit 1243 (Yes in step S902 in FIG. 9), since the most recent time updating has already been executed (Yes in step S904 in FIG. 9), the determination unit 1247 of the key unit 12 confirms the reservation information (the start date and time and the end date and time of reservation of the vehicle 10) included in the authentication key corresponding to the authenticated mobile terminal 20, and determines whether or not the current time is within the reservation time of the vehicle 10 (step S906 in FIG. 9).

In a case where the current time is within the reservation time of the vehicle 10 (Yes in step S906 in FIG. 9), the locking and unlocking processing unit 1249 of the key unit 12 performs a process of unlocking the door of the vehicle 10 to cause the door of the vehicle 10 to be unlocked in step S1040.

Thus, in steps S1002 to S1040, a series of operations including the updating of the time of the key unit 12 (synchronization with the time of the center server 40), startup of the locking and unlocking function through confirmation of various restriction requirements, and unlocking of the door of the vehicle 10 based on the unlocking operation is completed.

As described above, in the embodiment, the authentication processing unit 1245 performs the authentication of the mobile terminal 20 based on the authentication key transmitted from the mobile terminal 20, and the locking and unlocking processing unit 1249 unlocks or locks the door of the vehicle 10 in a case where the authentication of the mobile terminal 20 by the authentication processing unit 1245 has been successful and the communication processing unit 1243 has received the unlocking request or the locking request from the mobile terminal 20. In a case where the authentication processing unit 1245 performs the authentication of the mobile terminal 20 based on the authentication key once, the authentication processing unit 1245 prohibits the authentication of the terminal even in a case where the communication processing unit 1243 then receives the same authentication information from a certain terminal. As described above, when the key unit 12 performs authentication of the mobile terminal 20 based on the authentication key (the first authentication information) once, the key unit 12 prohibits the authentication of the terminal even when the same authentication key is then received from another terminal. Therefore, even when a malicious third party can intercept the authentication key when the authentication key is transmitted from the mobile terminal 20 to the key unit 12, the other terminal cannot be authenticated using the intercepted authentication key. Therefore, even in a case where the authentication key transmitted from the mobile terminal 20 to the key unit 12 disposed inside the vehicle is intercepted, it is possible to suppress unauthorized use of the vehicle based on the intercepted authentication key.

In the embodiment, the mobile terminal 20 includes the storage unit 239 that stores the communication encryption key (the first encryption key) for encrypting data, and the key unit 12 includes the storage unit 1250 for storing the communication decryption key (the first decryption key) for decrypting the data encrypted with the communication encryption key. The communication processing unit 231 of the mobile terminal 20 transmits the unlocking request and the locking request encrypted with the communication encryption key to the key unit 12, and the locking and unlocking processing unit 1249 of the key unit 12 unlocks or locks the door of the vehicle 10 in a case where the authentication of the mobile terminal 20 by the authentication processing unit 1245 has been successful and the communication processing unit 1243 has received the unlocking request or the locking request which can be decrypted with the communication decryption key. As described above, the mobile terminal 20 transmits the unlocking request and the locking request encrypted with the communication encryption key to the key unit 12, and the key unit 12 unlocks or locks the vehicle 10 in a case where the authentication of the mobile terminal 20 has been successful and the key unit 12 has received the unlocking request or the locking request that can be decrypted with the communication decryption key corresponding to the communication encryption key. Therefore, the key unit 12 can determine that the request is a request from the authenticated mobile terminal 20 by receiving the unlocking request and the locking request that can be decrypted with the communication decryption key. Therefore, once the authentication of the mobile terminal 20 based on the authentication key is completed, the user of the mobile terminal 20 can unlock or lock the door of the vehicle 10 without using the authentication key even in a situation in which the authentication of the mobile terminal 20 using the authentication key can be performed merely once, and it is possible to maintain convenience of the user while suppressing unauthorized use of the vehicle 10 by a malicious third party.

In the embodiment, the key unit 12 includes the storage unit 1250 that stores the transmission side encryption key 1250c (the second encryption key) for encrypting data, and the communication processing unit 1243 which transmits the communication encryption key encrypted with the transmission side encryption key to the mobile terminal 20 when the authentication of the mobile terminal 20 by the authentication processing unit 1245 is successful, and then, transmits an updated communication encryption key different from the previous encryption key encrypted with the transmission side encryption key 1250c to the mobile terminal 20 each time a transition from the communication disabled state to the communication enabled state occurs between the key unit 12 and the mobile terminal 20. The mobile terminal 20 includes the communication processing unit 231 that receives the communication encryption key encrypted with the transmission side encryption key, which is transmitted from the key unit 12, and the storage unit 239 that stores the reception side decryption key (the second decryption key) for decrypting the data encrypted with the transmission side encryption key 1250c. As described above, the key unit 12 can transmit the communication encryption key encrypted with the transmission side encryption key 1250c to the mobile terminal 20, and the mobile terminal 20 can receive the encrypted communication encryption key from the key unit 12 and decrypt the encrypted communication encryption key with the reception side decryption key held by the mobile terminal. Therefore, it is possible to cause the mobile terminal 20 to acquire the decrypted communication encryption key while suppressing the leakage of the communication encryption key when the communication encryption key is transmitted from the key unit 12 to the mobile terminal 20. The communication encryption key is transmitted from the key unit 12 to the mobile terminal 20 in a case where the authentication of the mobile terminal 20 is completed. Each time a transition from the communication disabled state to the communication enabled state occurs between the mobile terminal 20 and the key unit 12, that is, each time the user holding the mobile terminal 20 locks the door, and temporarily departs from the vehicle 10, and then, approaches the vehicle 10 again, a communication encryption key different from the previous communication encryption key is transmitted from the key unit 12 to the mobile terminal 20. Therefore, even when the communication encryption key leaks due to spoofing or the like, the communication encryption key needed for the next unlocking or the like is updated in a case where the user holding the mobile terminal 20 temporarily departs from the vehicle 10, and therefore, it is possible to further suppress unauthorized use of the vehicle 10 by a malicious third party.

In the embodiment, the locking and unlocking system 1 includes the center server 40 that can communicate with the mobile terminal 20, and the center server 40 includes the authentication key generation unit 432 that generates the authentication key (the first authentication information), and the communication processing unit 431 that transmits the authentication key generated by the authentication key generation unit 432 to the mobile terminal 20. The mobile terminal 20 includes the communication processing unit 232 that receives the authentication key from the center server 40. As described above, since the generation of the authentication key and the transmission of the authentication key to the mobile terminal 20 are performed by the center server 40, the user of the mobile terminal 20 can easily acquire the authentication key, and it is possible to suppress unauthorized use of the vehicle 10 by a malicious third party in the locking and unlocking system 1 having the configuration in which the authentication key is generated by the center server 40 and transmitted to the mobile terminal 20.

In the embodiment, the mobile terminal 20 (the authentication key acquisition unit 233) acquires the authentication key from the center server 40, but the present disclosure is not limited to the above configuration. For example, an aspect in which the mobile terminal 20 (the authentication key acquisition unit 233) acquires the authentication key from a specific terminal provided in a predetermined store related to a share car, a rental car, or the like through wired or wireless communication may be adopted.

In the embodiment, the center server 40 includes the reception side decryption key DB 436 that stores the reception side decryption key, and when the communication processing unit 431 of the center server 40 transmits the authentication key to the mobile terminal 20, the communication processing unit 431 of the center server 40 transmits the signal (authentication key information) including the authentication key and the reception side decryption key to the mobile terminal 20, the communication processing unit 232 of the mobile terminal 20 receives the signal including the authentication key and the reception side decryption key from the center server 40, and the storage unit 239 stores the received reception side decryption key. As described above, in a case where the authentication key is transmitted from the center server 40 to the mobile terminal 20, the reception side decryption key capable of decrypting the communication encryption key encrypted with the transmission side encryption key is transmitted from the center server 40 to the mobile terminal 20. Therefore, the mobile terminal 20 can acquire the reception side decryption key for decrypting the communication encryption key encrypted with the transmission side encryption key transmitted from the key unit 12 together with the authentication key.

In the embodiment, the locking and unlocking system 1 includes the locking and unlocking device 11 attached to the vehicle 10, the key unit 12 includes the storage unit 1250 that stores the locking and unlocking key information 1250b (the second authentication information) associated with the vehicle 10, the locking and unlocking device 11 includes the RF reception processing unit 1132 that receives then unlocking signal and the locking signal (the second request signal) from the key unit 12, the authentication processing unit 1133 that performs authentication of the key unit 12 based on locking and unlocking key information included in the unlocking signal or the locking signal in a case where the RF reception processing unit 1132 receives the unlocking signal and the locking signal, and the locking and unlocking controller 1134 that unlocks or locks the door of the vehicle 10 in a case where the authentication processing unit 1133 has succeeded in the authentication. The locking and unlocking processing unit 1249 of the key unit 12 transmits the unlocking signal and the locking signal including the locking and unlocking key information 1250b to the locking and unlocking device 11 as a process of unlocking or locking the door of the vehicle 10. As described above, the key unit 12 can unlock or lock the door of the vehicle 10 in response to the success of the authentication of the key unit 12 based on the locking and unlocking key information in the locking and unlocking device 11 by transmitting the unlocking signal and the locking signal including the locking and unlocking key information associated with the vehicle 10 to the locking and unlocking device attached to the vehicle 10. Therefore, it is not needed for the authentication key to be information associated with the vehicle 10 such as information associated with the key unit 12, and even when the authentication key that has not been used leaks, it is needed to further specify a correspondence relationship between the key unit 12 and the vehicle 10 (which key unit is present in which vehicle) in addition to a correspondence relationship between the authentication key and the key unit 12, and it is possible to further suppress unauthorized use of the vehicle 10.

Although the key unit 12 (the locking and unlocking processing unit 1249) is configured to unlock and lock the door of the vehicle 10 via the collating ECU 113 of the locking and unlocking device 11 in the embodiment, the key unit 12 may be configured to directly transmit a control command to the body ECU 114 and operate the door lock motor 115, for example.

Although the embodiment for performing the present disclosure has been described in detail above, the present disclosure is not limited to the specific embodiments, and various modifications and changes can be performed without departing from the scope of the gist of the present disclosure.

For example, a target of the locking and unlocking and the use reservation using the mobile terminal 20 is the vehicle in the above-described embodiment, but the present disclosure is not limited to the vehicle as long as the target can be used by a plurality of users in split time slots and can be locked and unlocked. That is, the vehicle that is a target of the locking and unlocking and the use reservation in the above-described embodiment may be replaced with a facility that can be locked and unlocked such as a conference room, a health center, or a gymnasium. As described above, it is possible to suppress unauthorized use of the facility based on the intercepted authentication information (authentication key), as in the above-described embodiment.

What is claimed is:

1. A locking and unlocking system comprising:
a mobile terminal; and
a key unit provided in a vehicle or a facility and configured to lock and unlock a door of the vehicle or the facility, wherein
the mobile terminal includes a processor configured to transmit predetermined first authentication information and a first request signal for requesting unlocking or locking of the door of the vehicle or the facility to the key unit, the first authentication information including a reservation time of the vehicle or the facility,
the key unit includes a processor configured to:
receive the first authentication information and the first request signal from the mobile terminal;
perform authentication of the mobile terminal based on the first authentication information when the first authentication information is received; and
perform a process of unlocking or locking the door of the vehicle or the facility when the authentication of the mobile terminal based on the first authentication information has succeeded and the first request signal is received,
the mobile terminal includes a first memory configured to store a predetermined first encryption key for encrypting data,
the key unit includes a second memory configured to store a first decryption key for decrypting data encrypted with the first encryption key,
the processor of the mobile terminal is configured to transmit the first request signal encrypted with the first encryption key to the key unit,
the processor of the key unit is configured to unlock or lock the door of the vehicle or the facility in a case where the authentication of the mobile terminal has succeeded and the first request signal that is to be decrypted with the first decryption key is received,
the key unit includes a third memory configured to store a predetermined second encryption key for encrypting data,
the processor of the key unit is configured to transmit the first encryption key encrypted with the second encryption key to the mobile terminal in a case where the authentication of the mobile terminal based on the first authentication information has succeeded, and then, transmit the first encryption key updated and encrypted with the second encryption key to the mobile terminal each time a transition from a communication disabled state to a communication enabled state occurs between the key unit and the mobile terminal, the communication disabled state being caused when a distance between the key unit and the mobile terminal is equal to or larger than a predetermined distance,
the processor of the mobile terminal is configured to receive the first encryption key encrypted with the second encryption key, which is transmitted by the key unit,
the mobile terminal includes a fourth memory configured to store a second decryption key for decrypting data encrypted with the second encryption key,
the first request signal that is to be decrypted with the first decryption key includes time information, and the processor of the key unit is configured to generate a time based on the time information, and perform the process of unlocking or locking the door of the vehicle or the facility when the time is within the reservation time,
the processor of the key unit is configured to prohibit the authentication of the mobile terminal by blocking communication between the key unit and the mobile terminal such that the process of unlocking or locking the door of the vehicle or the facility is prohibited when the time is not within the reservation time and the first authentication information has been received from the mobile terminal,
wherein the locking and unlocking system further comprises a locking and unlocking device attached to the vehicle or the facility,
the key unit includes a fifth memory configured to store second authentication information associated with the vehicle or the facility, the second authentication information including locking and unlocking key information,
a processor of the locking and unlocking device configured to
receive a second request signal including the second authentication information from the key unit,
perform authentication of the key unit based on the second authentication information included in the second request signal when the second request signal is received, and
unlock or lock the door of the vehicle or the facility when the processor of the locking and unlocking device has succeeded in the authentication, and
the processor of the key unit is configured to transmit the second request signal including the second authentication information to the locking and unlocking device as the process of unlocking or locking the door of the vehicle or the facility.

2. The locking and unlocking system according to claim 1, further comprising a server configured to communicate with the mobile terminal, wherein:
a processor of the server is configured to
generate the first authentication information, and
transmit the first authentication information generated by the generation unit to the mobile terminal; and
the processor of the mobile terminal is configured to receive the first authentication information from the server.

3. The locking and unlocking system according to claim 2, wherein:
the server includes a sixth memory configured to store the second decryption key;
the processor of the server is configured to transmit a signal including the first authentication information and the second decryption key to the mobile terminal when the processor of the server transmits the first authentication information;

the processor of the mobile terminal is configured to receive the signal including the first authentication information and the second decryption key from the server; and the fourth memory is configured to store the second decryption key received by the processor of the mobile terminal.

4. A key unit that is provided in a vehicle or a facility and is configured to unlock or lock a door of the vehicle or the facility including a locking and unlocking device in response to a first request signal for requesting locking or unlocking of the vehicle or the facility, the first request signal being transmitted from a mobile terminal, the key unit comprising:

a processor configured to receive predetermined first authentication information and the first request signal from the mobile terminal, the first authentication information including a reservation time of the vehicle or the facility;

perform authentication of the mobile terminal based on the first authentication information in a case where the processor has received the first authentication information; and perform a process of unlocking or locking the door of the vehicle or the facility in a case where the processor has succeeded in the authentication of the mobile terminal and the processor has received the first request signal, wherein the key unit includes a first memory configured to store a first decryption key for decrypting data encrypted with a predetermined first encryption key, wherein the processor of the key unit is configured to unlock or lock the door of the vehicle or the facility in a case where the authentication of the mobile terminal has succeeded and the first request signal that is to be decrypted with the first decryption key is received, wherein the key unit includes a second memory configured to store a predetermined second encryption key for encrypting data, wherein the processor of the key unit is configured to transmit the first encryption key encrypted with the second encryption key to the mobile terminal in a case where the authentication of the mobile terminal based on the first authentication information has succeeded, and then, transmit the first encryption key updated and encrypted with the second encryption key to the mobile terminal each time a transition from a communication disabled state to a communication enabled state occurs between the key unit and the mobile terminal, the communication disabled state being caused when a distance between the key unit and the mobile terminal is equal to or larger than a predetermined distance, wherein the first request signal that is to be decrypted with the first decryption key includes time information, and the processor is configured to generate a time based on the time information, and perform the process of unlocking or locking the door of the vehicle or the facility when the time is within the reservation time, wherein the processor of the key unit is configured to prohibit the authentication of the mobile terminal by blocking communication between the key unit and the mobile terminal such that the process of unlocking or locking the door of the vehicle or the facility is prohibited when the time is not within the reservation time and the first authentication information has been received from the mobile terminal, wherein the key unit includes a third memory configured to store second authentication information associated with the vehicle or the facility, the second authentication information including locking and unlocking key information, and wherein the processor of the key unit is configured to transmit a second request signal including the second authentication information to the locking and unlocking device as the process of unlocking or locking the door of the vehicle or the facility.

* * * * *